US012664492B2

(12) United States Patent　(10) Patent No.: US 12,664,492 B2
Masuda et al.　(45) Date of Patent: Jun. 23, 2026

(54) AUTOMATION SUPPORT DEVICE AND AUTOMATION SUPPORT METHOD

(71) Applicant: Hitachi, Ltd., Tokyo (JP)

(72) Inventors: Mineyoshi Masuda, Tokyo (JP);
Koichi Murayama, Tokyo (JP); Hideki Minato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 406 days.

(21) Appl. No.: 18/172,724

(22) Filed: Feb. 22, 2023

(65) Prior Publication Data

US 2024/0013111 A1　Jan. 11, 2024

(30) Foreign Application Priority Data

Jul. 7, 2022　(JP) ................................. 2022-110080

(51) Int. Cl.
　*G06Q 10/06*　(2023.01)
　*G06Q 10/0631*　(2023.01)
(52) U.S. Cl.
　CPC ................ *G06Q 10/063114* (2013.01); *G06Q 10/06312* (2013.01)
(58) Field of Classification Search
　CPC .................................................... G06Q 10/06
　See application file for complete search history.

(56) References Cited

U.S. PATENT DOCUMENTS

| | | | | |
|---|---|---|---|---|
| 9,358,464 | B1 * | 6/2016 | Johnson | ................ A63F 13/847 |
| 11,853,935 | B2 * | 12/2023 | Volkov | ........... G06Q 10/063116 |
| 2001/0051890 | A1 * | 12/2001 | Burgess | ......... G06Q 10/063112 |
| | | | | 705/7.14 |
| 2006/0254601 | A1 * | 11/2006 | Matsumura | .............. G09B 7/02 |
| | | | | 128/898 |
| 2007/0192157 | A1 * | 8/2007 | Gooch | ................... G06Q 10/10 |
| | | | | 705/7.41 |
| 2012/0053992 | A1 * | 3/2012 | Erol | ................... G06Q 30/0206 |
| | | | | 705/7.35 |
| 2014/0081691 | A1 * | 3/2014 | Wendell | ........... G06Q 10/06311 |
| | | | | 705/7.15 |
| 2017/0076296 | A1 | 3/2017 | Hirpara et al. | |
| 2018/0075404 | A1 * | 3/2018 | Hendrickson | .......... G06Q 50/40 |
| 2019/0318291 | A1 * | 10/2019 | Diriye | ........... G06Q 10/063112 |
| 2022/0294710 | A1 * | 9/2022 | Swvigaradoss | ..... H04L 41/5054 |

* cited by examiner

*Primary Examiner* — Nga B Nguyen
(74) *Attorney, Agent, or Firm* — Volpe Koenig

(57) ABSTRACT

An automation support device includes a processor and a storage unit. In this automation support device, the storage unit stores a man-hour estimation rule that is a rule for estimating man-hours for automation of a work procedure manual related to a procedure of work. Then, the processor calculates man-hours required for automation of the work procedure manual by using the man-hour estimation rule stored in the storage unit with the work procedure manual and a work execution record which is a record of execution according to the work procedure manual as inputs.

15 Claims, 27 Drawing Sheets

*FIG. 3*

| 302 | 303 | 304 | 305 | 306 | 307 |
|---|---|---|---|---|---|
| WORK ID | WORK NAME | TARGET SYSTEM | REGISTRATION DATE AND TIME | URGENCY DEGREE | WORKFLOW ID |
| T 0 1 | DATABASE TEMPORARY MAINTENANCE | SYSTEM A | 2022-03-23 08:00:00 | MIDDLE | W 0 1 |
| T 0 2 | FAILURE RESPONSE | SYSTEM B | 2022-03-23 08:30:00 | HIGH | W 0 2 |
| ‥ | ‥ | ‥ | ‥ | ‥ | ‥ |

| WORKFLOW ID 402 | STEP NUMBER 403 | WORK TYPE 404 | REQUIRED SKILL NAME 405 | REQUIRED SKILL LEVEL 406 | WORK INSTRUCTION SENTENCE 407 | CHECK LIST ID 408 | AUTOMATIC SCRIPT ID 409 |
|---|---|---|---|---|---|---|---|
| W 0 1 | 1 | MANUAL | DATABASE | 5 | • CHECK NUMBER OF DATABASE CONNECTIONS • EXECUTE DATABASE STOP COMMAND ... | C 0 1 | None |
| W 0 1 | 2 | AUTOMATIC | None | None | None | None | S 0 1 |
| : | : | : | : | : | : | : | : |

400

401a

401b

| WORK ID | WORKFLOW ID | STEP NUMBER | WORK TARGET |
|---------|-------------|-------------|-------------|
| T 0 1 | W 0 1 | 1 | SERVER A |
| T 0 1 | W 0 1 | 2 | SERVER A |
| | . . | | |

| SYSTEM | CONSTITUENT | PLATFORM | APPLICATION |
|--------|-------------|----------|-------------|
| SYSTEM A | SERVER A | O S 1 | DATABASE |
| SYSTEM A | SERVER B | O S 2 | WEB SERVER |
| : | : | : | : |
| SYSTEM B | SERVICE A | CLOUD 1 | DATABASE |
| : | : | : | : |

602    603    604    605

601a
601b
601c

600

| CHECK LIST ID | CHECK ITEM | CHECK |
|---|---|---|
| C 0 1 | DATABASE IS STOPPED NORMALLY | NOT DONE |
| ‥ | ‥ | ‥ |
| C 1 0 0 | SCREENSHOT OF NORMAL COMPLETION ON GUI IS ACQUIRED | DONE |
| ‥ | ‥ | ‥ |

| AUTOMATIC SCRIPT ID | ITEM | CONTENT |
|---|---|---|
| | | ARGUMENT 1 |
| | ARGUMENT | ARGUMENT 2 |
| S 0 1 | NORMAL PROCESSING | NEW ACCOUNT CREATION PROCESS |
| | ERROR PROCESSING | CONNECTION ERROR RESPONSE PROCESS |
| | ERROR PROCESSING | NO AUTHORIZATION ERROR RESPONSE PROCESS |
| . . | . . | . . |

| WORKFLOW ID | STEP NUMBER | CHANGE DATE AND TIME | CHANGE CONTENT |
|---|---|---|---|
| W 0 1 | 1 | 2020-09-15 15:00:00 | NEWLY CREATED |
| ‥ | ‥ | ‥ | ‥ |
| W 0 1 | 1 | 2021-09-15 15:00:00 | WORK ITEM IS ADDED |
| ‥ | ‥ | ‥ | ‥ |

1000

1002    1003    1004    1005

1001a

1001b

| WORKFLOW ID | STEP NUMBER | FEEDBACK TYPE | FEEDBACK CONTENT | AGREEMENT NUMBER |
|---|---|---|---|---|
| W 0 1 | 3 | GUI ACCESS | API CONVERSION OF GUI SCREEN A | 1 5 |
| W 1 0 0 | 2 | DATA ACCESS | API CONVERSION OF FILE ACCESS B | 3 |
| W 0 1 | 4 | : | : | : |
| : | : |  |  |  |

FIG. 13

| 1300 | | | | | | | | | | |
|---|---|---|---|---|---|---|---|---|---|---|
| | 1302 | 1303 | 1304 | 1305 | 1306 | 1307 | 1308 | 1309 | 1310 | 1311 |
| | WORK ID | WORKFLOW ID | STEP ID | WORK TYPE | WORKER SKILL NAME | WORKER SKILL LEVEL | START TIME | END TIME | OCCURRED ERROR NUMBER | LOG FILE NAME |
| | T 0 1 | W 0 1 | 1 | MANUAL | DATABASE | 7 | 2022-03-23 22:00:00 | 2022-03-24 00:00:00 | 1 | GUI ACCESS LOG 〜1301a DATABASE LOG 〜1301b |
| | T 0 1 | W 0 1 | 2 | AUTOMATIC | None | None | 2022-03-24 00:00:00 | 2022-03-24 00:20:00 | 0 | SYSTEM LOG |
| | | : | | : | | | : | | : | |

*FIG. 14*

| WORK ID | WORKFLOW ID | STEP NUMBER | GUI NAME | IMAGE DATA |
|---------|-------------|-------------|----------|------------|
| T 0 1 | W 0 1 | 1 | DATABASE CONTROL SCREEN | IMAGE DATA 1 |
| | . . | | . . | . . |

| RULE ID | MAN-HOUR TYPE | MAN-HOUR ESTIMATION RULE | WEIGHT |
|---------|---------------|--------------------------|--------|
| R 0 1 | MAINTENANCE | MAINTENANCE MAN-HOUR RULE | 3 |
| R 0 2 | DEVELOPMENT | NORMAL PROCESSING MAN-HOUR RULE | 5 |
| R 0 3 | DEVELOPMENT | ERROR PROCESSING MAN-HOUR RULE | 4 |
| R 0 4 | DEVELOPMENT | TEST MAN-HOUR RULE | 5 |
| | ‥ | ‥ | ‥ |

| WORKFLOW ID | STEP NUMBER | RULE ID | ESTIMATED MAN-HOURS | MAN-HOUR TYPE | TOTAL ESTIMATED MAN-HOURS | TOTAL ACTUAL MAN-HOURS |
|---|---|---|---|---|---|---|
| W 0 1 | 1 | R 0 1 | 9 | MAINTENANCE | 9 | 8 |
| | | R 0 2 | 2 | DEVELOPMENT | 1 3 | 2 1 |
| | | R 0 3 | 4 | | | |
| | | R 0 4 | 7 | | | |
| : | : | : | : | : | : | : |

Figure 25:
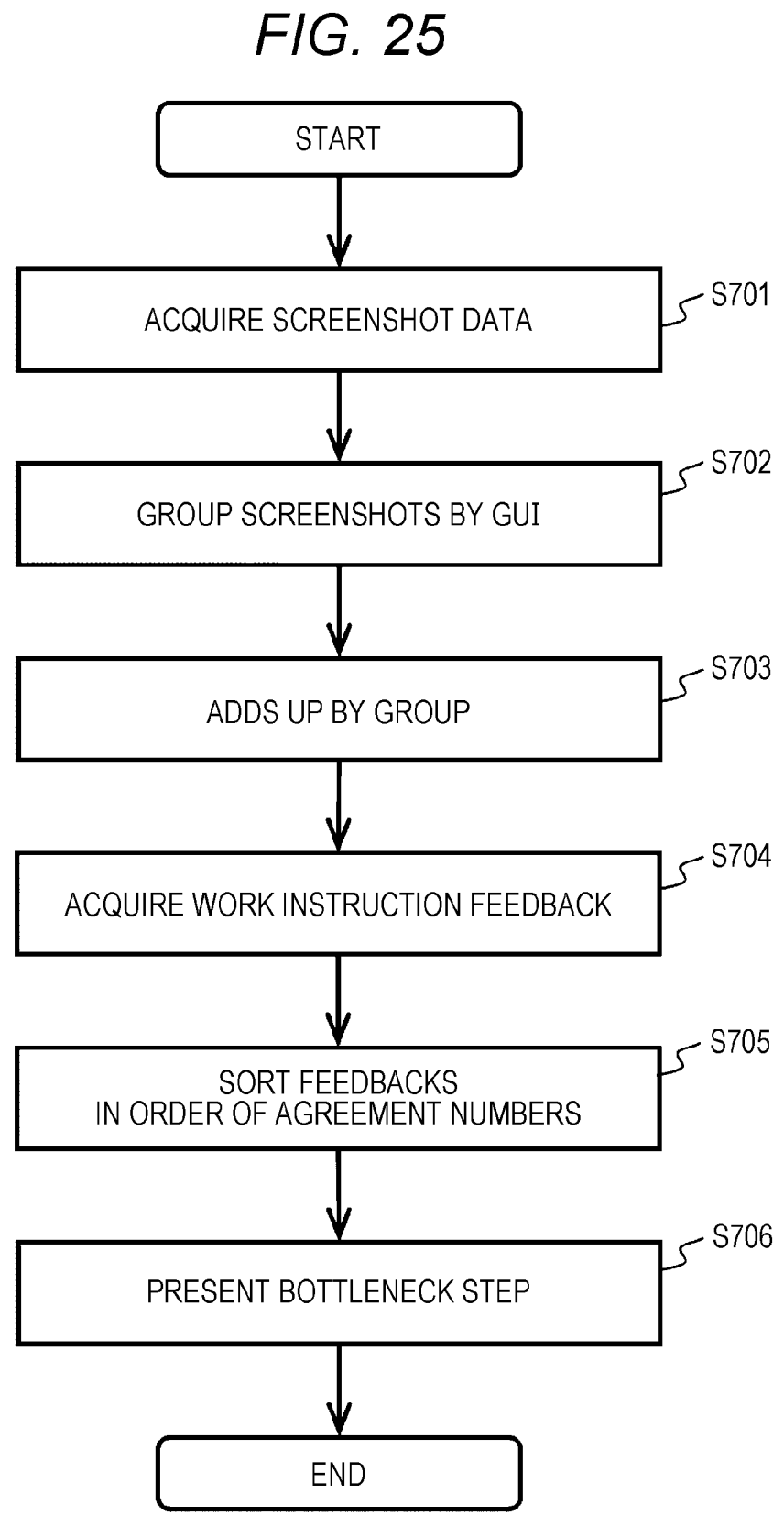

START

ACQUIRE SCREENSHOT DATA — S701

GROUP SCREENSHOTS BY GUI — S702

ADDS UP BY GROUP — S703

ACQUIRE WORK INSTRUCTION FEEDBACK — S704

SORT FEEDBACKS
IN ORDER OF AGREEMENT NUMBERS — S705

PRESENT BOTTLENECK STEP — S706

END

2600

BOTTLENECK STEP TABLE

■ BOTTLENECK STEP TABLE BASED ON NUMBER OF SCREENSHOTS

2601

| GUI NAME | NUMBER OF RELATED WORKFLOWS | NUMBER OF TIMES |
|---|---|---|
| DATABASE CONTROL SCREEN | 4 | 1 0 TIMES |
| : | : | : |

■ BOTTLENECK STEP BASED ON FEEDBACKS

2602

| STEP | NUMBER OF RELATED WORKFLOWS | AGREEMENT NUMBER | NUMBER OF TIMES |
|---|---|---|---|
| API CONVERSION OF GUI SCREEN A | 2 | 15 | 2 1 TIMES |
| API CONVERSION OF FILE ACCESS B | 1 | 2 | 7 TIMES |
| : | : | : | : |

AUTOMATION SUPPORT DEVICE AND AUTOMATION SUPPORT METHOD

BACKGROUND OF THE INVENTION

1. Field of the Invention

The present invention relates to an automation support device and an automation support method.

2. Description of the Related Art

Work of operation management (which may be referred to as operation work) of an IT system includes many pieces of work performed manually. The operation work includes, for example, maintenance of a database, update of an application, coping with a failure, and the like. The operation work is executed by an operation department upon receiving a request from a business department periodically or on demand. When the operation work is manual work, a work procedure manual is attached to an operation work request. The operation department allocates operation work to a worker having a skill of executing the operation work. An operation worker performs the operation according to the work procedure manual, and records that the operation is correctly performed.

There are many types and number of pieces of operation work, and manually performing all the pieces of operation work is inefficient and requires a large amount of cost. In order to reduce cost, it is necessary to advance efficiency by automating work with a computer. For this reason, it is necessary to select a piece of work having a high time-saving effect by automation from many pieces of manual work. In order to support this selection work, a tool for recording the operation work and selecting a piece of work performed a large number of times and having long execution time has started to be used.

However, as a method of selecting work to be automated, a method of simply selecting the work only based on execution time is considered to be insufficient. Operation management has various viewpoints, and prioritization must be performed in a composite manner.

For example, it is considered that US20170076296 A1 discloses that tickets are grouped based on similarity of words in work request tickets, and then priority of work to be automated is determined on the basis of degree of urgency given to the tickets and degree of importance of an IT system as a work target. A solution disclosed in US20170076296 A1 is considered to be an effective work selection method from the viewpoint of minimizing downtime when a failure occurs in an IT system. However, there is no information to be presented about man-hours for automation of work.

SUMMARY OF THE INVENTION

Automation is not realistic in a case where a large number of man-hours are required even for work for which total execution time is long and a time reduction effect is expected by automation. On the other hand, work that can be automated with a small number of man-hours although a time reduction effect is moderate is a realistic option for automation.

From the above, an object of the present invention is to calculate a guideline for man-hours required for automation of work and to support the automation.

According to a first aspect of the present invention, an automation support device described below is provided. The automation support device includes a processor and a storage unit. The storage unit stores a man-hour estimation rule that is a rule for calculating man-hours for automation of a work procedure manual related to a procedure of work. The processor calculates man-hours required for automation of the work procedure manual by using the man-hour estimation rule stored in the storage unit with the work procedure manual and a work execution record that is a record of execution according to the work procedure manual as inputs.

According to a second aspect of the present invention, an automation support method described below is provided. The automation support method is a method performed using a processor and a storage unit. In this method, the processor acquires a work procedure manual related to a procedure of work and a work execution record which is a record of execution according to the work procedure manual, and calculates man-hours required for automation of the work procedure manual by referring to a man-hour estimation rule that is a rule for calculating man-hours required for automation of the work procedure manual stored in the storage unit and using the man-hour estimation rule.

According to the present invention, it is possible to calculate a guideline for man-hours required for automation of work and to support the automation. Note that an object, configuration, and effect other than those described above will be clarified by description of an embodiment for implementing the invention below.

BRIEF DESCRIPTION OF THE DRAWINGS

FIG. 3 illustrates a configuration example of a work request table according to the embodiment;

FIG. 4 illustrates a configuration example of a workflow definition table according to the embodiment;

FIG. 6 illustrates a configuration example of a system configuration table according to the embodiment;

FIG. 10 illustrates a configuration example of a work instruction change history table according to the embodiment;

FIG. 13 illustrates a configuration example of a workflow execution record table according to the embodiment;

FIG. 14 illustrates a configuration example of a screenshot table according to the embodiment;

FIG. 16 illustrates a configuration example of a man-hour estimation rule table according to the embodiment;

FIG. 17 illustrates a configuration example of a man-hour estimation result table according to the embodiment;

FIG. 25 illustrates an example of a process of processing of identifying and presenting a bottleneck step according to the embodiment;

DESCRIPTION OF THE PREFERRED EMBODIMENTS

Figure 1:
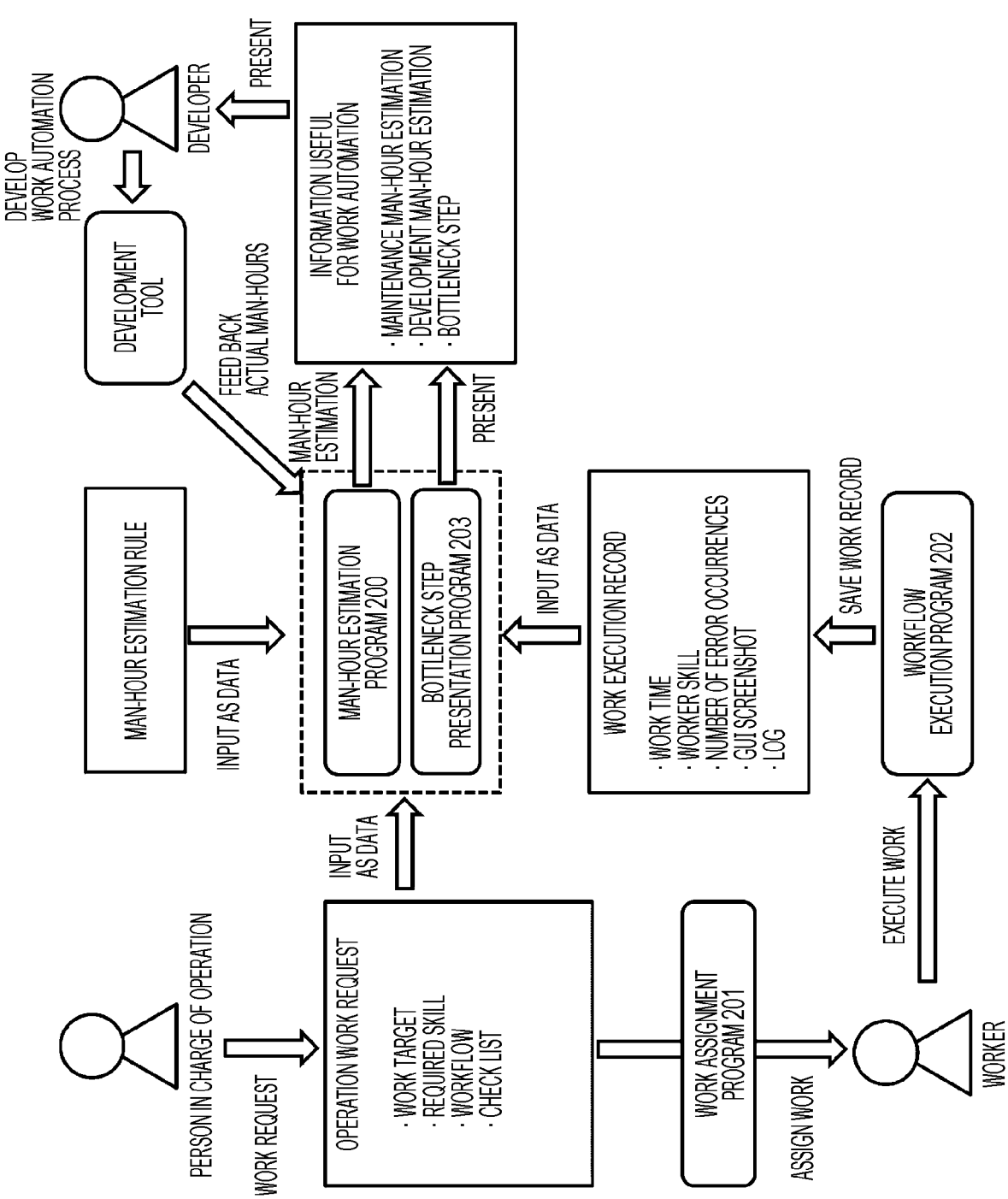
FIG. 1 illustrates an example of an outline of processing in an embodiment.

Hereinafter, an embodiment of the present invention will be described with reference to the drawings. The embodiment is for describing the present invention, and omission and simplification are made as appropriate for the sake of clarity of description. The present invention can be carried out in other various forms. Unless otherwise specified, each constituent may be singular or plural.

There is a case where a position, size, shape, range, and the like of each constituent illustrated in the drawings do not represent an actual position, size, shape, range, and the like, in order to facilitate understanding of the invention. For this reason, the present invention is not necessarily limited to a position, size, shape, range, and the like disclosed in the drawings.

Examples of various types of information may be described in terms of expressions such as "table", "list", and "queue". However, various types of information may be expressed in a data structure other than these. For example, various types of information such as "XX table", "XX list", and "XX queue" may be "XX information". In describing identification information, expressions such as "identification information", "identifier", "name", "ID", and "number" are used. However, these can be replaced with each other.

In a case where there are a plurality of constituents having the same or similar functions, description may be made by attaching different subscripts to the same reference numerals. Further, in a case where a plurality of such constituents do not need to be distinguished from each other, the description may be made by omitting a subscript.

In the embodiment, there is a case where processing performed by executing a program is described. Here, a computer executes a program by a processor (for example, CPU and GPU), and performs processing defined by the program using a storage resource (for example, a memory), an interface device (for example, a communication port), and the like. For this reason, the subject of the processing performed by executing the program may be a processor. Similarly, the subject of the processing performed by executing the program may be a controller, a device, a system, a computer, or a node having a processor. The subject of the processing performed by executing the program only needs to be an arithmetic unit, and may include a dedicated circuit that performs specific processing. Here, the dedicated circuit is, for example, a field programmable gate array (FPGA), an application specific integrated circuit (ASIC), a complex programmable logic device (CPLD), or the like.

The program may be installed on the computer from a program source. The program source may be, for example, a program distribution server or a computer-readable storage medium. In a case where the program source is a program distribution server, the program distribution server may include a processor and a storage resource that stores a program to be distributed, and the processor of the program distribution server may distribute a program to be distributed to another computer. Further, in the embodiment, two or more programs may be realized as one program, or one program may be realized as two or more programs.

In the embodiment, automation support related to a technique related to an operation management task of an IT system will be described. First, an outline of work selection support by an automation support device will be described with reference to FIG. 1.

FIG. 1 illustrates a state in which processing proceeds from a person in charge of operation on the upper left. The person in charge of operation requests an operation department to perform operation work. The person in charge of operation first creates an operation work request. The operation work request is data in which content of operation work to be requested is described, and includes a work target system (work target), a skill necessary for work (required skill), a work procedure manual (workflow), a check list for confirming normal completion of work, and the like. Note that the workflow in the present embodiment is a processing procedure in which manual work and automatic processing coexist.

A work assignment program 201 receives the operation work request and assigns work to a worker who can execute the work. The worker operates a workflow in the work request using a workflow execution program 202. If the step of the workflow is manual work, the worker performs the work, and if the step is automatic processing, the workflow execution program 202 automatically performs the processing. At this time, a work execution record is created as a result of performance of the work. The work execution record includes time required for work (work time), a skill of a worker (worker skill), an error during work (the number of error occurrences), a GUI screenshot indicating that operation by a GUI is normally completed, a log output from a system of a work target, and the like.

According to a rule stored in a man-hour estimation rule, a man-hour estimation program 200 calculates an estimation value of man-hours for automation of work using the operation work request and the work execution record as inputs, and presents the estimation value to a developer. For example, the man-hour estimation program 200 calculates maintenance cost of an automatic process in which work is automated according to a maintenance man-hour estimation rule. The man-hour estimation program 200 estimates small maintenance man-hours if a change frequency of a procedure is sufficiently low from a history of a change of a procedure manual of manual work included in the workflow. As another rule, the man-hour estimation program 200 estimates man-hours for development and testing, which will be described later in detail.

A bottleneck step presentation program 203 identifies a bottleneck step using the operation work request and the work execution record as inputs and presents the bottleneck step to the developer. The bottleneck step means a work step that hinders automation of work. In the present description, such a step may be referred to as a bottleneck step. For example, the bottleneck step presentation program 203 adds up GUI screenshots of a work execution record, identifies a GUI screen used in common in many workflows, and presents the GUI screen as a bottleneck step. This will also be described later in detail.

With reference to information useful for work automation presented by the above program, the developer selects work having a high time reduction effect by automation and small development man-hours. The developer performs development work for automating manual work by using a development tool. The development tools include an integrated development environment for program creation, a version management tool for a program, a communication tool between developers, and the like. With reference to data recorded in these tools, time required for development and a program amount can be acquired for each piece of automated work.

Finally, the man-hour estimation program 200 cooperates with a development tool to adjust a parameter of a man-hour estimation rule based on a difference between man-hours actually required for development and a man-hour estimation calculated by the program, so that a value of the man-hour estimation becomes close to the actual man-hours.

By repeating the above cycle, a ratio of automated work can be efficiently improved.

According to the work selection support described above, work to be automated can be selected in consideration of not only a time reduction effect by automation of work but also estimated man-hours for automation of work.

Figure 2:
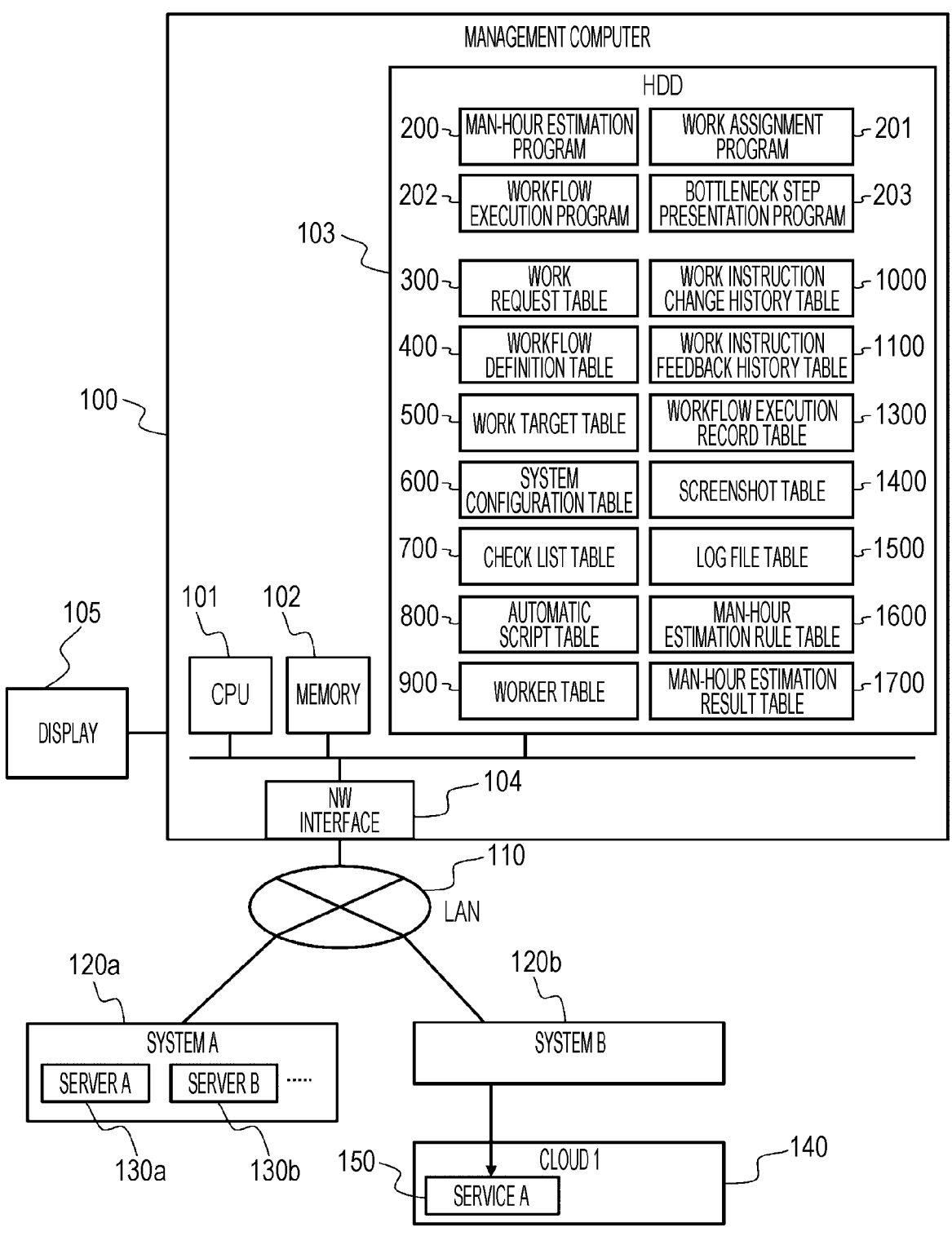
FIG. 2 illustrates a configuration example of a system according to the embodiment.

FIG. 2 illustrates a configuration of an automation support system according to the embodiment. The automation support system can be configured to include a management computer 100 (automation support device) and a plurality of IT systems. The management computer 100 is a computer on which the man-hour estimation program 200, the work assignment program 201, the workflow execution program 202, and the bottleneck step presentation program 203 operate. The management computer 100 is connected to a system A (120a) and a system B (120b) which are IT systems to be managed via a LAN 110.

The management computer 100 includes a CPU 101, a memory 102, an HDD 103 that stores persistent data, an NW interface 104, and a display 105 (display device). The CPU 101 (processor) is a main body that executes various programs (200 to 203). The HDD 103 (storage unit) stores various programs and a table that stores data referred to by the programs. These programs are loaded from the HDD 103 into the memory 102 and executed on the CPU 101. Further, the management computer 100 includes an appropriate input device (not illustrated) used to input data.

The system A (120a) is an IT system configured to include a plurality of servers (a server A (130a) and a server B (130b) in the diagram). On the other hand, the system B (120b) is an IT system using a service A (150) of a cloud 1 (140). An operation worker executes a command, calls an API, and performs operation control using a GUI on these IT systems via the management computer 100.

Next, an example of various data and the like will be described with reference to FIGS. 3 to 17. FIG. 3 illustrates a configuration example of a work request table 300. In the work request table 300, data of work requested by a person in charge of operation is stored in each row (for example, a row 301a). A work ID 302 is a unique identifier of each piece of work. A work name 303 is a name of requested work. A target system 304 is a name of an IT system as a target of work. Registration date and time 305 is a date and time when a work request is registered. Urgency degree 306 is degree of urgency of work. In the diagram, work of urgency degree of "medium" and "high" is registered. Work with urgency degree of "high" is work that needs to be started and executed as soon as possible, such as investigation of a cause of failure. A workflow ID 307 is a unique identifier of a workflow including a specific procedure of this work request. The entity of a workflow is stored in a workflow definition table 400.

FIG. 4 illustrates a configuration example of the workflow definition table 400. The workflow definition table 400 is a table that stores data corresponding to a specific procedure of work. Each row (for example, a row 401a and a row 401b) corresponds to a step of a workflow. A workflow ID 402 is a unique identifier of a workflow. A step number 403 is a sequence number assigned to a step constituting a workflow. A work type 404 represents a type of work, that is, "manual" work or "automatic" work. A required skill name 405 is a name of a skill required of a worker who executes a step of the row. There may be a plurality of required skills. A required skill level 406 is a proficiency level of a skill required of a worker. A work instruction sentence 407 is an instruction sentence for a worker described in a natural sentence. Values of the required skill name 405, the required skill level 406, and the work instruction sentence 407 are stored when the work type 404 is "manual". A check list ID 408 is a unique identifier of a check list used to confirm that a step of the row has been normally executed. Data of a check list is stored in a check list table 700. An automatic script ID 409 is a unique identifier of a script that automatically processes work. Data of an automatic script is stored in an automatic script table 800. A value of the automatic script ID 409 is stored when the work type 404 is "automatic".

Figure 5:
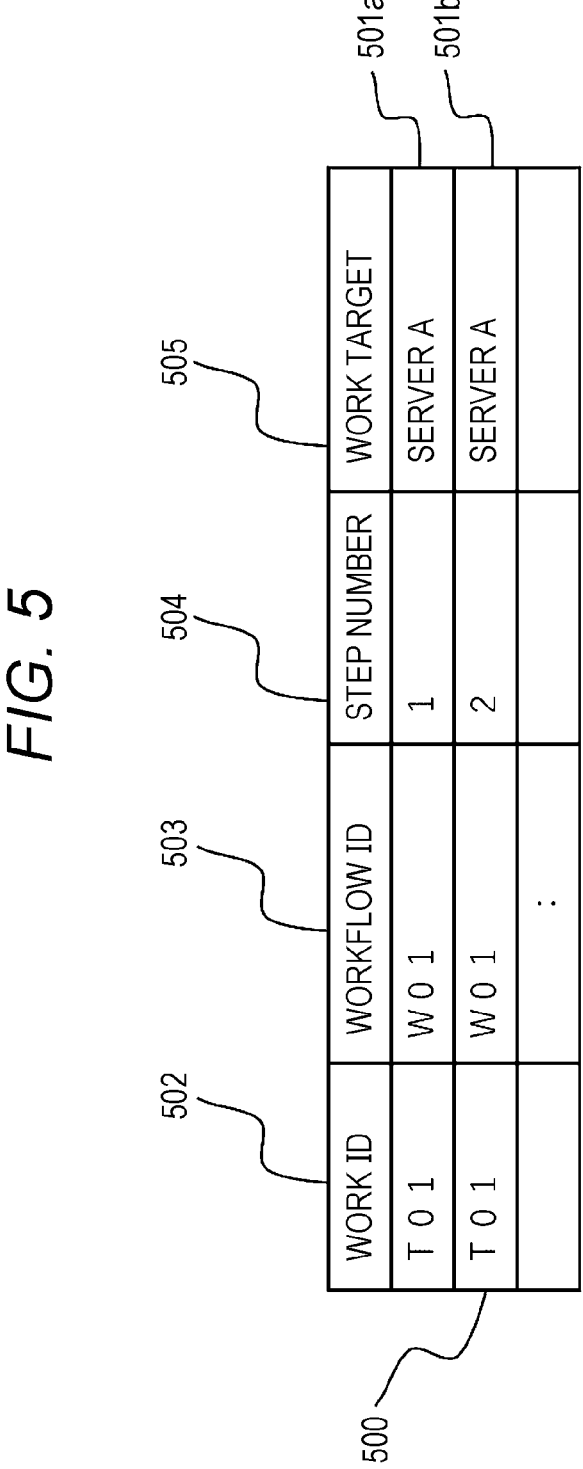
FIG. 5 illustrates a configuration example of a work target table according to the embodiment.

FIG. 5 illustrates a configuration example of a work target table 500. The work target table 500 is a table that stores a work target (which constituent of an IT system) of a step in each piece of work. Each row (for example, a row 501a and a row 501b) of the work target table 500 stores a work target in each step of work. A work ID 502 is a unique identifier of work and corresponds to the work ID 302 of the work request table 300. A workflow ID 503 and a step number 504 are data indicating a step of a workflow, and correspond to the workflow ID 402 and the step number 403 of the workflow definition table 400. A work target 505 represents a work target in the step. A constituent of each IT system is stored in a system configuration table 600 described later.

FIG. 6 illustrates a configuration example of the system configuration table 600. The system configuration table 600 is a table that stores a constituent constituting an IT system (in the present embodiment, the system A (120a) and the system B (120b)). Each row (for example, a row 601a, a row 601b, and a row 601c) in the table represents a constituent. A constituent 603 represents a name of a constituent, and a system 602 represents a name of an IT system to which the constituent belongs. A platform 604 is one of attributes of the constituent, and stores, for example, a type of an operating system that operates on the constituent or a name of a cloud when the constituent is a service on the cloud. An application 605 is one of attributes on the constituent, and stores a name of an application operating on the constituent, for example, a value such as a database or a web server. An attribute of a constituent stored in the system configuration table 600 is not limited to the platform 604 or the application 605, and another attribute value may be stored.

Figure 7:
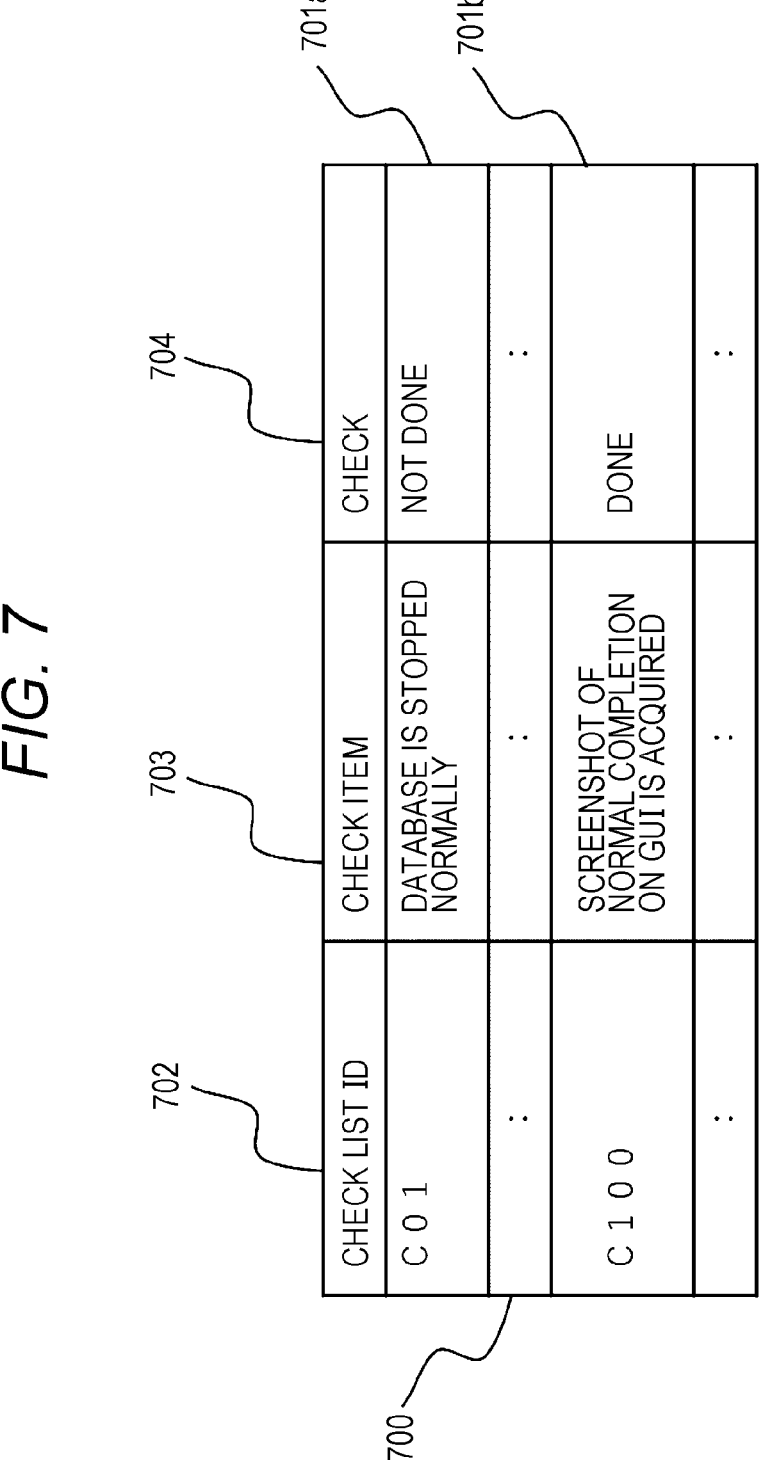
FIG. 7 illustrates a configuration example of a chest list table according to the embodiment.

FIG. 7 illustrates a configuration example of the check list table 700. The check list table 700 is a table that stores a check item for confirming that work is normally completed. One check item is stored in each row (for example, a row 701a and a row 701b) of the check list table 700. A check list ID 702 is a unique identifier given to a check item. The check list ID 702 corresponds to the check list ID 408 of the workflow definition table 400. A check item 703 is a natural sentence indicating content to be checked. A check 704 stores a value indicating whether or not the corresponding check item has been confirmed.

Figure 8:
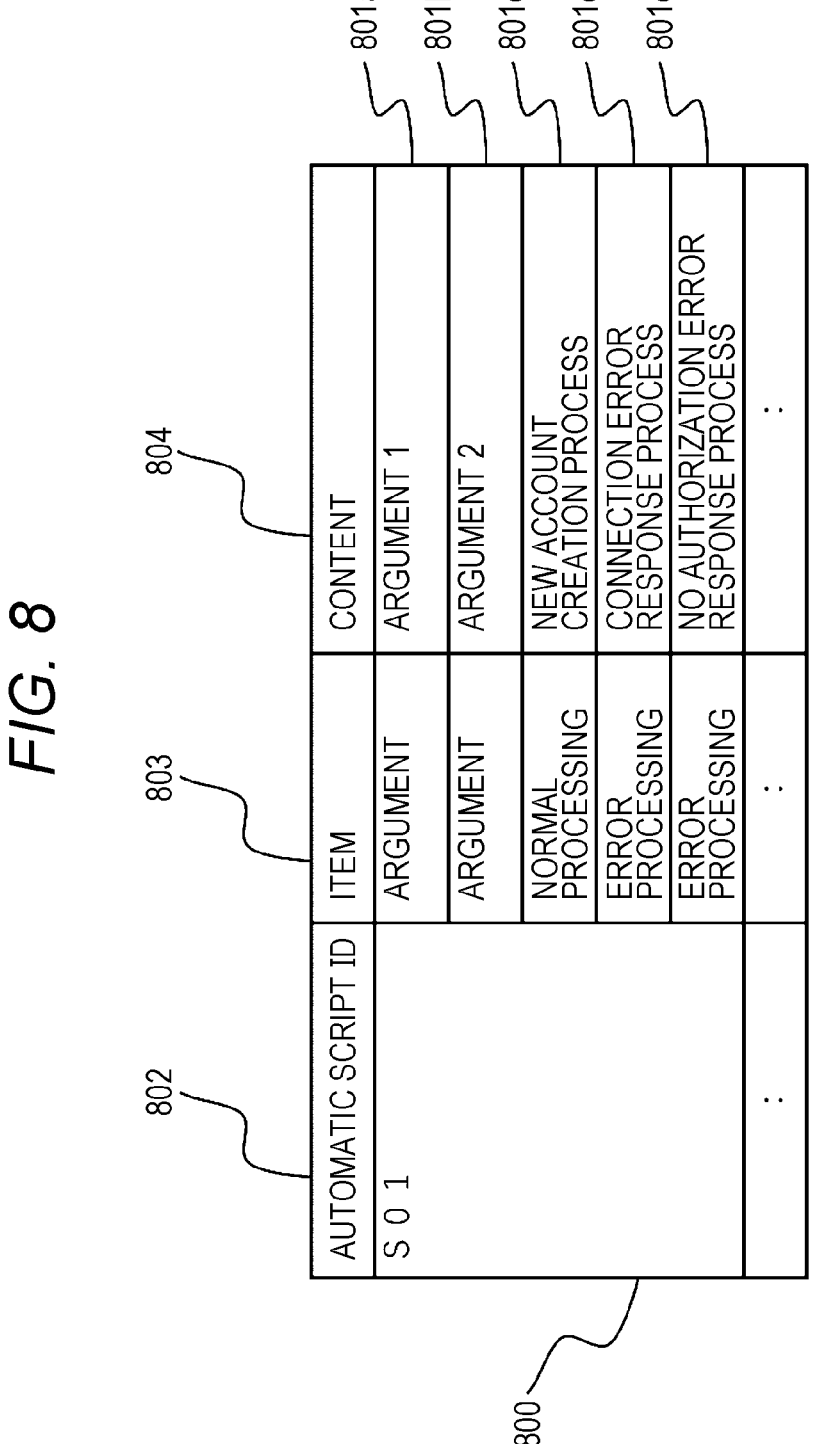
FIG. 8 illustrates a configuration example of an automatic script table according to the embodiment.

FIG. 8 illustrates a configuration example of the automatic script table 800. The automatic script table 800 is a table that stores content of a script in which work is automated. In each row (for example, a row 801a, a row 801b, a row 801c, a row 801d, and a row 801e) of the automatic script table 800, an element constituting a script is stored. An automatic script ID 802 is a unique identifier given to each automatic script. An automatic script ID 802 corresponds to the automatic script ID 409 of the workflow definition table 400. An item 803 represents a type of an element constituting an automatic script, and for example, values such as "argument", "normal processing", and "error processing" of a script are stored. Content 804 stores content of a script constituent. For example, when the item 803 is "argument", content such as a name, a data type, and a default value of an argument are stored. Further, when the item 803 is "normal processing", processing content and a program of a normal processing script are stored. When the item 803 is "error processing", processing content and a program of error processing are stored. In the present embodiment, the automatic script table 800 is stored in the management computer 100, but the table may be outside the management computer 100. For example, a development tool or a version control tool that cooperates with the management computer 100 may hold the table.

Figure 9:
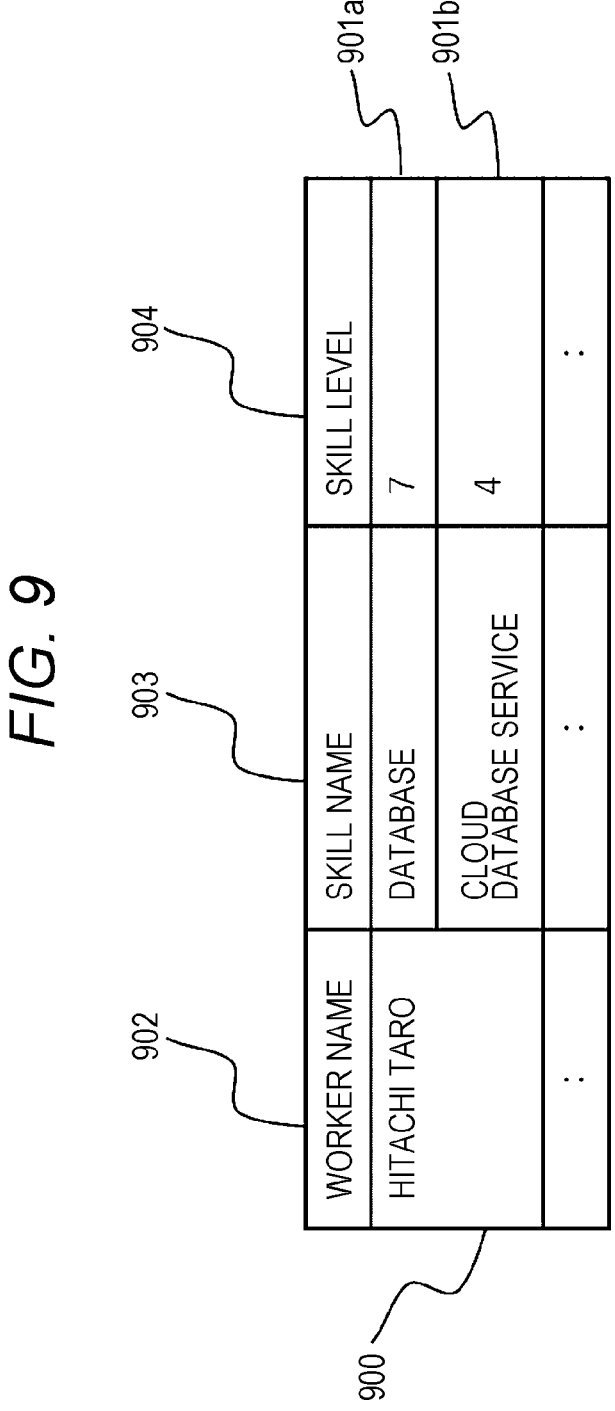
FIG. 9 illustrates a configuration example of a worker table according to the embodiment.

FIG. 9 illustrates a configuration example of a worker table 900. The worker table 900 is a table that stores information on a name and a possessed skill of a worker who performs work. In each row (for example, a row 901a and a row 901b) of the worker table 900, information on a skill possessed by a worker is stored. A worker name 902 stores a name of a worker. A skill name 903 stores a name of a skill possessed by a worker. A skill of a worker is, for example, a name of a target application such as a database or work such as backup or version upgrade. A skill level 904 is data indicating a proficiency level of a corresponding skill, and indicates that the greater a value of a skill level, the higher the proficiency level.

FIG. 10 illustrates a configuration example of a work instruction change history table 1000. The work instruction change history table 1000 is a table that stores a change history of content of a work instruction. In each row (for example, a row 1001a and a row 1001b) of this table, a difference caused by a change in the work instruction sentence 407 of the workflow definition table 400 is recorded. A workflow ID 1002 is a unique identifier of a workflow. A step number 1003 is a step number of a workflow. These correspond to the workflow ID 402 and the step number 403 of the workflow definition table 400, respectively. Change date and time 1004 is a date and time when the work instruction sentence 407 is changed. Change content 1005 stores a change difference of the work instruction sentence 407. In a case where the sentence is newly created, a value indicating new creation is stored instead of a change difference. Similarly to the automatic script table 800, the work instruction change history table 1000 may be stored in an external development tool cooperating with the management computer 100.

Figure 11:
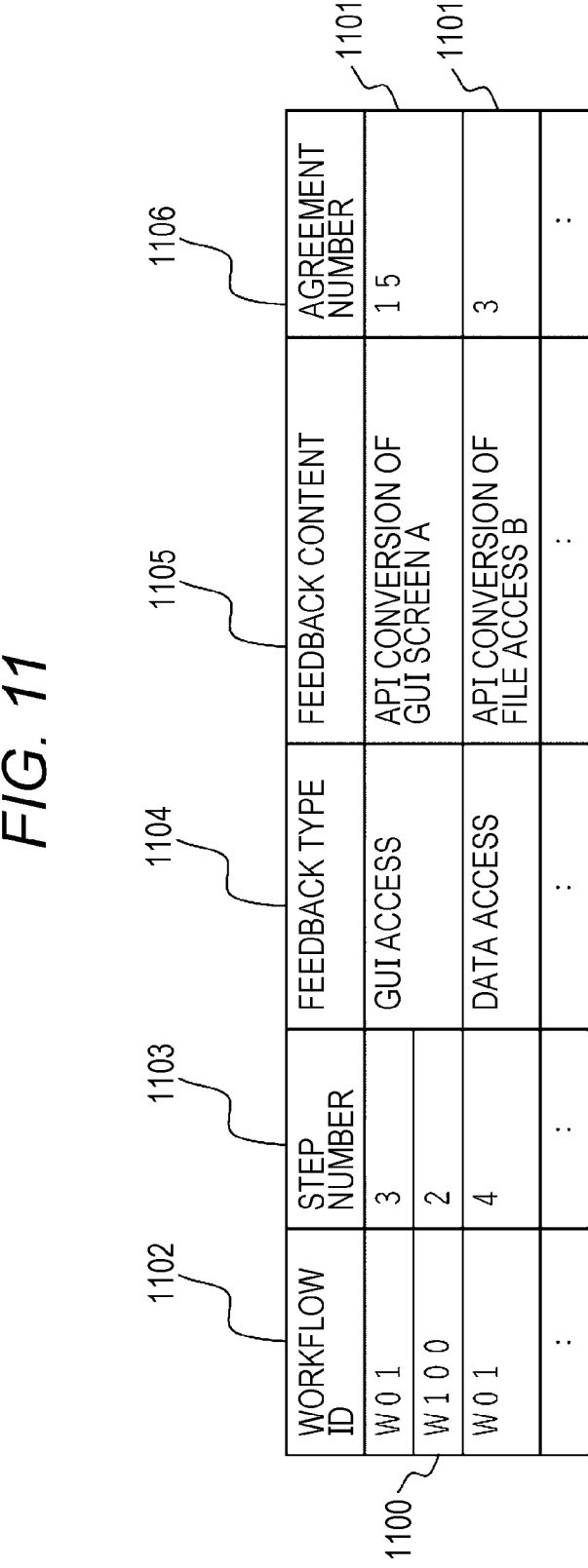
FIG. 11 illustrates a configuration example of a work instruction feedback history table according to the embodiment.

FIG. 11 illustrates a configuration example of a work instruction feedback history table 1100. The work instruction feedback history table 1100 is a table that stores, in each row (for example, a row 1101a and a row 1101b), feedback registered for instruction content by a worker who performs work by looking at the work instruction sentence 407. A workflow ID 1102 and a step number 1103 are a unique identifier and a step number indicating a step of a workflow, similarly to the above description. A feedback type 1104 indicates a type of feedback. For example, "GUI access" is feedback indicating that it is desirable to improve access to a GUI, and "data access" is feedback indicating that it is desirable to improve file manipulation performed manually. Feedback content 1105 is feedback content described in a natural sentence. The agreement number 1106 is the number of times that workers other than a worker who registers feedback agree with feedback content.

Figure 12:
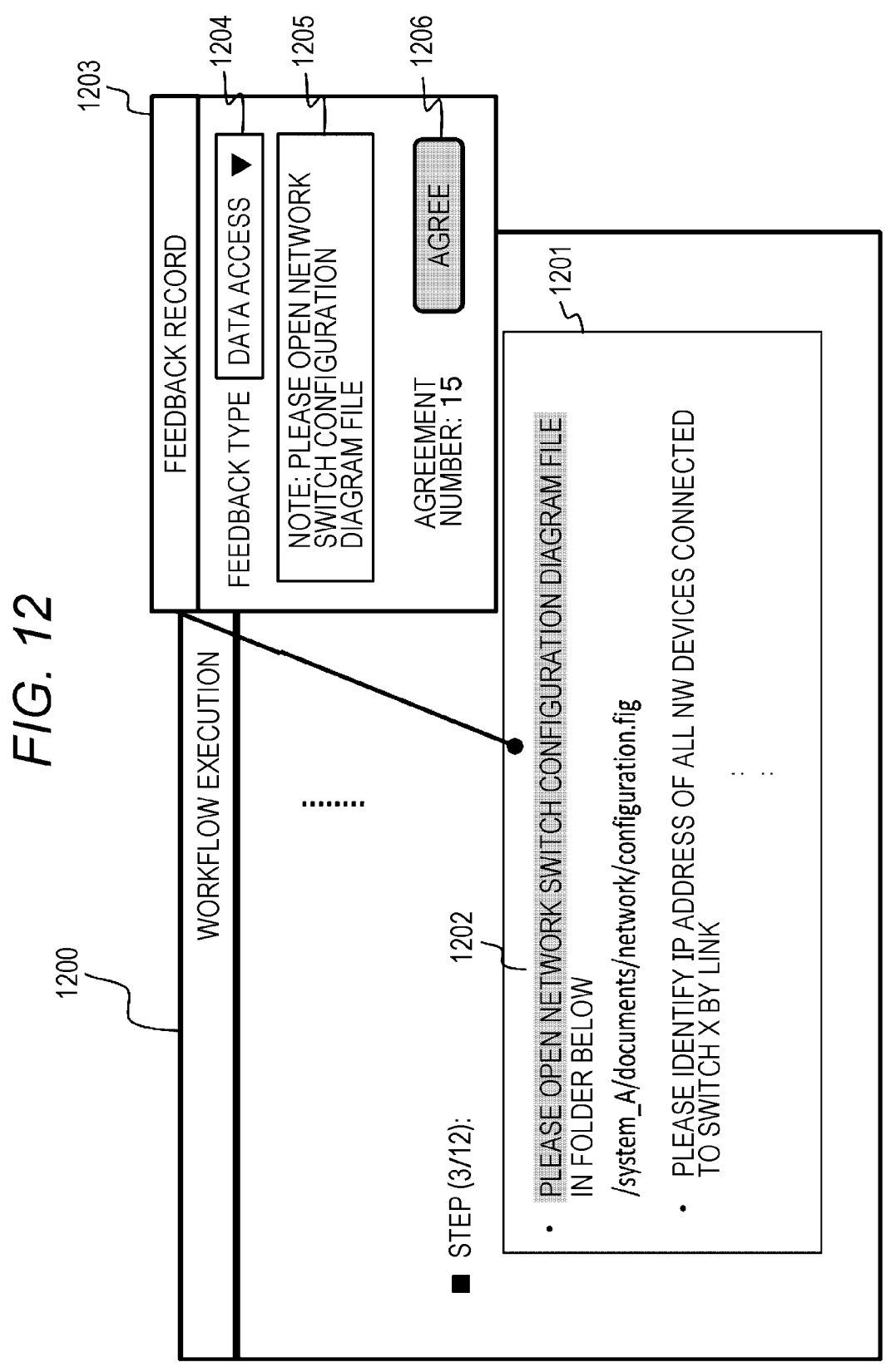
FIG. 12 illustrates an example of a screen for inputting feedback according to the embodiment.

FIG. 12 illustrates a screen example for recording feedback. A screen 1200 is a screen that a worker refers to when executing a workflow. In the diagram, a work instruction sentence is displayed. A worker performs work according to this instruction content (work instruction 1201). A worker selects a portion where the worker feels instruction content is complicated during work with a mouse or the like (shaded portion in FIG. 1202), and selects "recording of feedback" in a menu. Then, a feedback recording dialog 1203 is opened, and the worker inputs feedback content. In feedback type selection 1204, a type of feedback desired to be improved, for example, "data access" is selected in a case of API conversion of data access. The selected value is stored in the feedback type 1104. Further, the worker inputs a note to a feedback content input form 1205. The input content is stored in the feedback content 1105. A shaded portion in the diagram is also displayed on a screen to be referred to by another worker. That is, feedback is shared among workers. In a case where a worker agrees with feedback registered by another worker, the worker clicks an agree button 1206. By the above, the agreement number 1106 in the corresponding feedback in the work instruction feedback history table 1100 is incremented.

FIG. 13 illustrates a configuration example of a workflow execution record table 1300. The workflow execution record table 1300 is a table that stores a record indicating that a worker has performed instructed work. Each row (for example, a row 1301a and a row 1301b) of the workflow execution record table 1300 is a record for each step defined in a workflow of work. A work ID 1302 corresponds to the work ID of the work request table 300, and a workflow ID 1303 to a work type 1305 correspond to the workflow ID 402 to the work type 404 of the workflow definition table 400. A worker skill name 1306 and a worker skill level 1307 store a skill and a skill level possessed by a worker who has been assigned and executed work. The meaning of a stored value is similar to that of the required skill name 405 and the required skill level 406 of the workflow definition table 400. A start time 1308 and an end time 1309 represent times when a step of the row is started and ended. The occurred error number 1310 represents the number of errors that have occurred during execution of a step of the row. A log file name 1311 stores a name of a log file such as a log file output in a work target during execution of a step of the row or an access log of a GUI operated at the time of work. The log file name 1311 may store a plurality of values per step.

FIG. 14 illustrates a configuration example of a screenshot table 1400. The screenshot table 1400 is a table that stores a screenshot of a GUI or the like acquired by a worker according to a work instruction. Each row (for example, a row 1401*a*) of the screenshot table 1400 stores an image of a screenshot. The work ID 1402 to the step number 1404, which are similar to those of the workflow execution record table 1300, will be omitted from description. A GUI name 1405 represents a screen name of a GUI for which a screenshot is taken. Image data 1406 is data of a screenshot.

Figure 15:
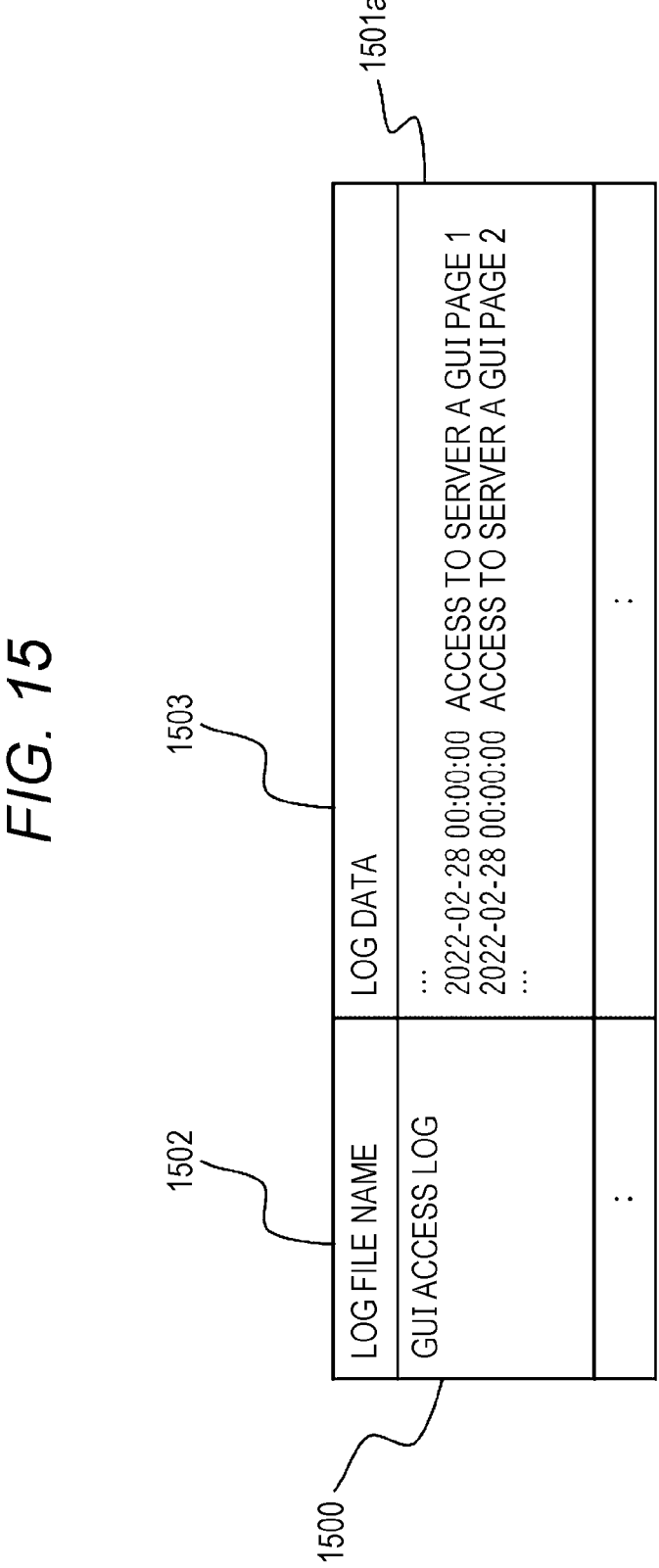
FIG. 15 illustrates a configuration example of a log file table according to the embodiment.

FIG. 15 illustrates a configuration example of a log file table 1500. The log file table 1500 is a table that stores output content of a log file in each row (for example, a row 1501*a*). A log file name 1502 represents a file name of a log and corresponds to the log file name 1311 of the workflow execution record table 1300. Log data 1503 is output content of a log file.

FIG. 16 illustrates a configuration example of a man-hour estimation rule table 1600. The man-hour estimation rule table 1600 is a table that stores various rules for estimating man-hours. One rule (man-hour estimation rule) is stored in each row (for example, a row 1601*a*, a row 1601*b*, a row 1601*c*, and a row 1601*d*) of the man-hour estimation rule table 1600. A rule ID 1602 is a unique identifier assigned to each rule. A man-hour type 1603 is a type of man-hours estimated by a rule of the row. For example, "maintenance" is stored for a rule for estimating maintenance man-hours, and "development" is stored for a rule for estimating development man-hours. A man-hour estimation rule 1604 stores a name of a man-hour estimation rule and program for estimation calculation. A weight 1605 is a weight to be multiplied by estimated man-hours calculated by each rule when man-hours estimated by each rule are added together.

FIG. 17 illustrates a configuration example of a man-hour estimation result table 1700. The man-hour estimation result table 1700 is a table that stores an estimation result of man-hours and actual man-hours. In each row (for example, a row 1701*a* and a row 1701*b*) of the man-hour estimation result table 1700, man-hours estimated by applying each rule for a step of a workflow are stored. A workflow ID 1702 and a step number 1703 represent a step of a workflow, as similar to the description above. A rule ID 1704 is a unique identifier representing a rule and corresponds to the rule ID 1602 of the man-hour estimation rule table 1600. Estimated man-hours 1705 indicates estimated man-hours obtained by applying a man-hour estimation rule of the row to a step of a workflow of the row. A man-hour type 1706 is similar to the man-hour type 1603 of the man-hour estimation rule table 1600. Total estimated man-hours 1707 stores a value obtained by adding up the estimated man-hours 1705 grouped according to the workflow ID 1702, the step number 1703, and the man-hour type 1706. Total actual man-hours 1708 stores actual man-hours required to create the step. Original actual man-hours are acquired from an external development tool.

Hereinafter, details of a process of processing in the embodiment will be described.

Figure 18:
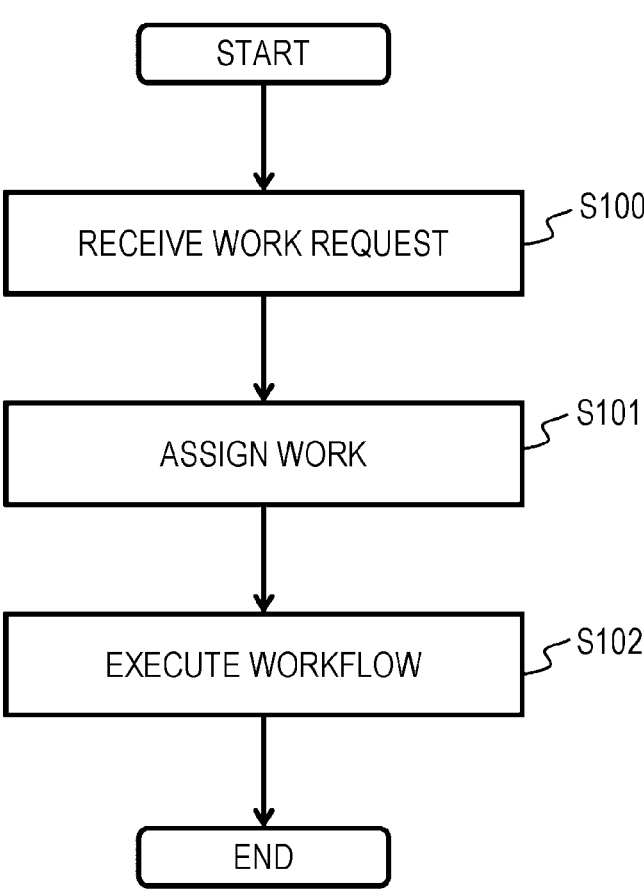
FIG. 18 illustrates an example of a process from reception of work to execution of work according to the embodiment.

FIG. 18 illustrates a process from reception of a work request to execution of work in the present embodiment.

In S100, the work assignment program 201 receives information regarding work input by a person in charge of operation, and adds a new row to the work request table 300 and the work target table 500. The person in charge of operation selects a workflow to be executed from among workflows stored in the workflow definition table 400 (if there is no desired workflow, a new workflow may be created.). The work assignment program 201 creates a new row in the work request table 300, and stores an ID of the selected workflow as a value of the workflow ID 307. A value input by the person in charge of operation is stored in the target system 304 and the urgency degree 306. Next, the person in charge of operation selects a work target in each step of the workflow. The person in charge of operation selects a work target from the constituents 603 of a work target system with reference to the system configuration table 600. The work assignment program 201 stores a work target selected for each step of the workflow in the work target table 500.

In S101, the work assignment program 201 assigns a worker to a work request. The work assignment program 201 acquires the required skill name 405 and the required skill level 406 of a workflow associated with the work request by the workflow ID 307. Next, the work assignment program 201 refers to the worker table 900 and searches for a worker having the skill and a skill level equal to or higher than a required value. The work assignment program 201 adds a row for the work to the workflow execution record table 1300. At this time, values in the rows of the work request table 300 and the workflow definition table 400 are copied to the work ID 1302 to the work type 1305. Further, a value in the corresponding row of the worker table 900 of the worker retrieved earlier is copied to the worker skill name 1306 and the worker skill level 1307.

In S102, the workflow execution program 202 executes work in cooperation with the worker and saves a record of the work. The workflow execution program 202 acquires a workflow designated by the workflow ID 307 of the work request table 300 from the workflow definition table 400, and sequentially executes each step. When the work type 404 is "automatic", an automatic script is executed, and when the work type 404 is "manual", the work instruction sentence 407 is presented to the worker. The worker performs the work according to the instruction sentence. In a case where an error occurs during work, the workflow execution program 202 records the number of errors in the occurred error number 1310. In a case where acquisition of a screenshot is instructed, the workflow execution program 202 receives a screenshot acquired by the worker, creates a new row in the screenshot table 1400, and stores the screenshot. Further, in a case where the workflow is accompanied by a check list, the workflow execution program 202 receives a check result of the check list performed by the worker and stores the check result in the check 704 of the check list table 700. Finally, the workflow execution program 202 stores content of a log output during the work in the log data 1503 of the log file table 1500. As described above, various records due to execution of the workflow are saved in the table, and data necessary for man-hour estimation for automation of work can be prepared.

Figure 19:
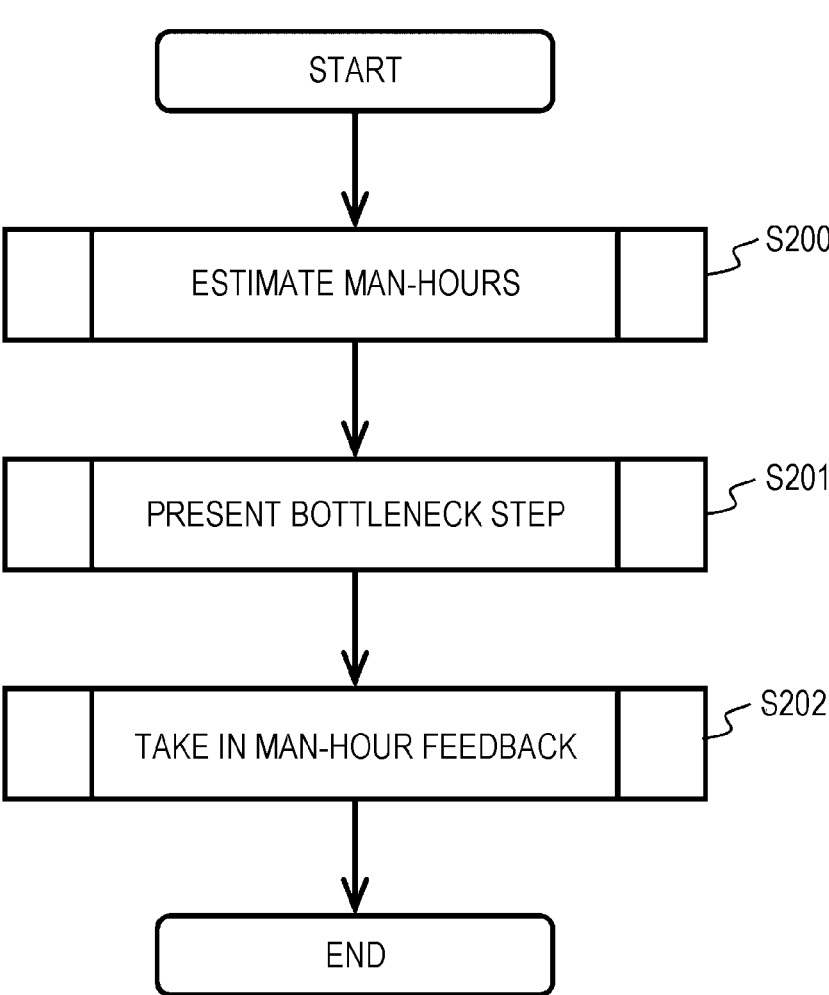
FIG. 19 illustrates an example of a process from man-hour estimation to man-hour feedback according to the embodiment.

FIG. 19 illustrates a process of processing in which the man-hour estimation program 200 and the bottleneck step presentation program 203 provide information useful for selection of work to be automated.

In S200, the man-hour estimation program 200 estimates man-hours required for automation of a step performed manually based on a work request and various pieces of information recorded as a result of work execution. The man-hour estimation program 200 reads the man-hour estimation rule 1604 from the man-hour estimation rule table 1600. The man-hour estimation program 200 reads a step of a workflow that is manually performed from the workflow definition table 400, applies the man-hour estimation rule previously read, and estimates man-hours required for automation of each step. An estimated value of man-hours as a result of the estimation is stored in the man-hour estimation result table 1700. A process of processing of each rule will be described later with reference to FIGS. 20 to 23.

In S201, the bottleneck step presentation program 203 presents statistical information on a step hindering automation. Details of the present processing will be described with reference to FIG. 25.

In S202, the bottleneck step presentation program 203 receives man-hours actually required for automation as feedback, and optimizes a parameter related to estimation on the basis of a difference from the man-hours estimated in S200 to improve accuracy of man-hour estimation. Details of the present processing will be described with reference to FIG. 27.

Figure 20:
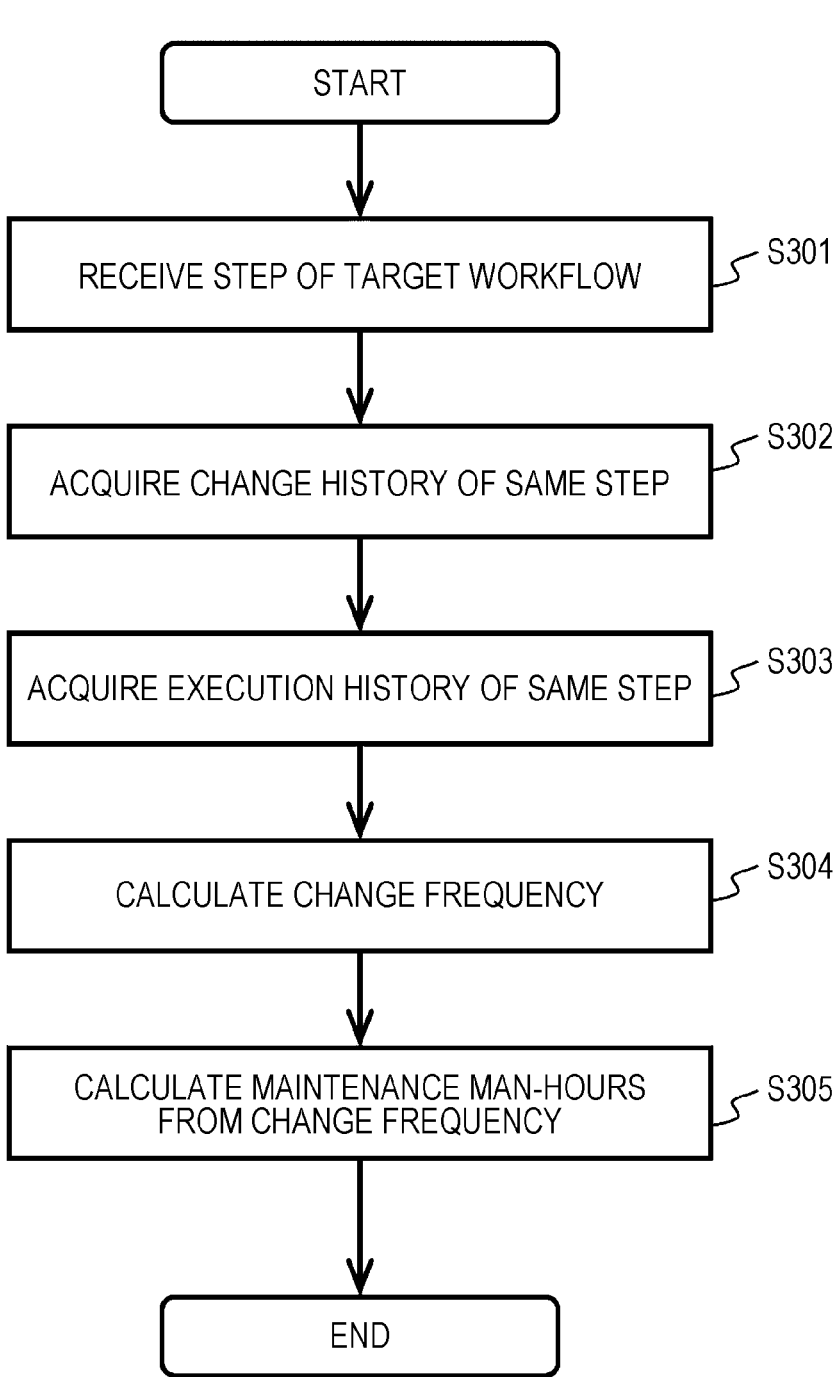
FIG. 20 illustrates an example of a process of a maintenance man-hour estimation processing according to the embodiment.

FIG. 20 illustrates a process of maintenance man-hour estimation processing based on a maintenance man-hour rule stored in the man-hour estimation rule table 1600.

In S301, the man-hour estimation program 200 receives a step of a workflow for which man-hours are to be estimated. The step is designated by a workflow ID and a step number.

In S302, the man-hour estimation program 200 refers to the work instruction change history table 1000 using a workflow ID and a step number as keys, and acquires all change histories for the step.

In S303, the man-hour estimation program 200 refers to the workflow execution record table 1300 using the workflow ID and the step number as keys, and acquires all execution records of the step.

In S304, the man-hour estimation program 200 calculates "change frequency" of the step. The change frequency is, for example, a value obtained by dividing the number of changes of the step acquired in S302 by elapsed time from creation of the step. As another calculation method of the change frequency, the number of changes in a latest certain period (for example, latest one month) may be used instead of elapsed time from creation of the step. Further, as another calculation method of the change frequency, the number of changes per the number of executions of the step may be used. For example, in a case where the number of changes of the step in the latest one month is 1 and the number of executions of the step is 100, the change frequency may be set to a division value of the above, that is, 1÷100=0.01.

In S304, the man-hour estimation program 200 may limit a target step for which the change frequency is calculated. For example, in a case where the step is not suitable for estimation of maintenance man-hours since elapsed time from creation of the step is short, the step may be excluded from a target of maintenance man-hour estimation. Alternatively, the change frequency in one month immediately after creation of the step and the change frequency in latest one month are calculated, and in a case where the change frequency immediately after the creation is high and a difference between the change frequency immediately after the creation and the change frequency in latest one month is small, that is, in a case where changes in step content are continuously made at a high frequency, the step may be excluded from a target of the maintenance man-hour estimation (in this case, since maintenance man-hours seem to be too large, the step may be excluded from a target of overall man-hour estimation).

Finally, in S305, the man-hour estimation program 200 multiplies the change frequency obtained in S304 by the weight 1605 in the man-hour estimation rule table 1600 to calculate maintenance man-hours, and stores a value of the maintenance man-hours in the estimated man-hours 1705 as an estimation value of the maintenance man-hours according to a maintenance man-hour rule for the step in the man-hour estimation result table 1700.

Figure 21:
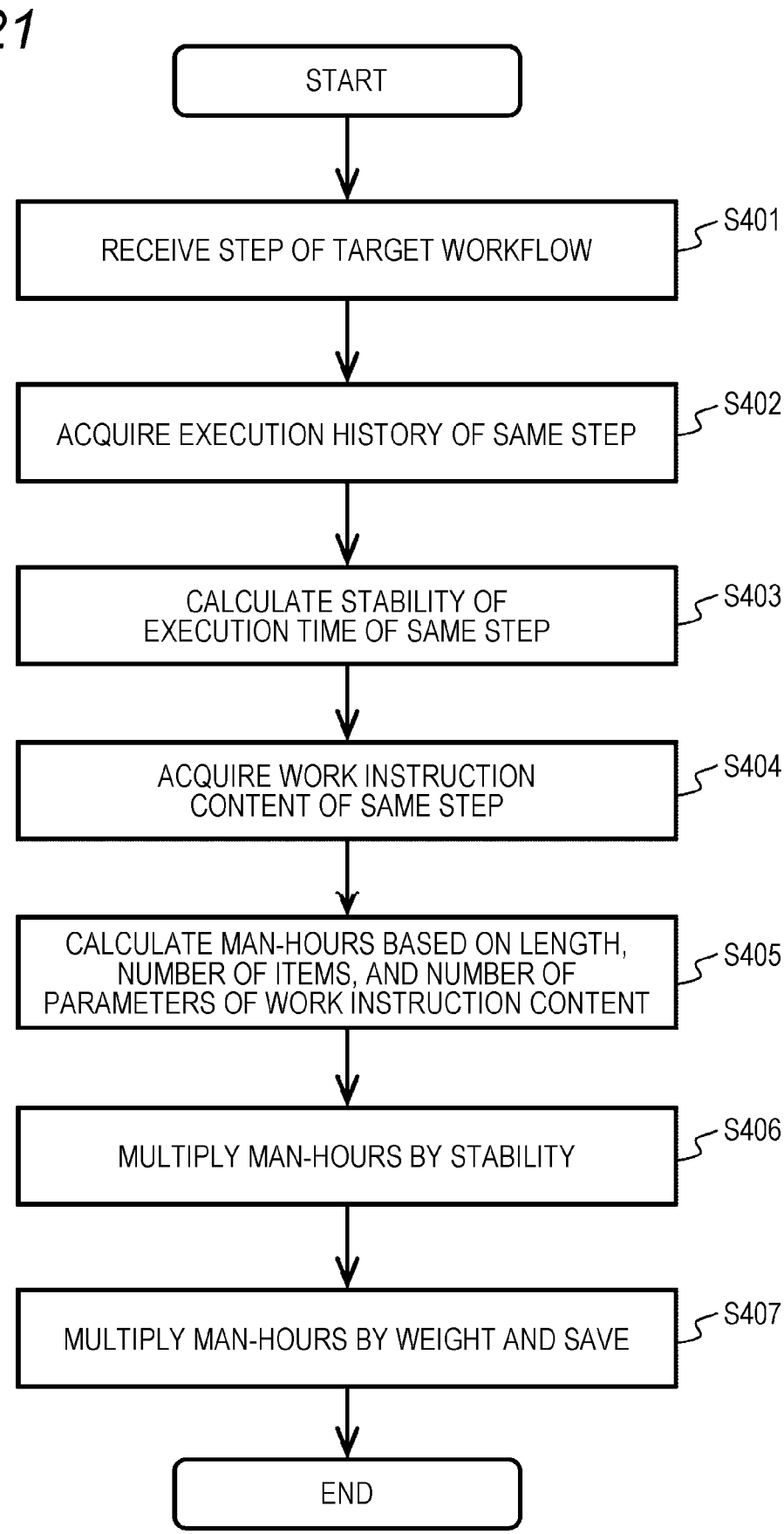
FIG. 21 illustrates an example of a process of processing of estimating normal processing development man-hours according to the embodiment.

FIG. 21 illustrates a process of development man-hour estimation processing by a normal processing man-hour estimation rule stored in the man-hour estimation rule table 1600.

In S401, the man-hour estimation program 200 receives a step of a workflow for which man-hours are to be estimated. The step is designated by a workflow ID and a step number.

In S402, the man-hour estimation program 200 refers to the workflow execution record table 1300 using a workflow ID and a step number as keys, and acquires all change histories for the step.

In S403, the man-hour estimation program 200 calculates "stability" of execution time of the step. Here, the stability is the magnitude of variation in execution time of the step. The fact that variation in execution time is little means that work is easy to develop with few troubles. A method of calculating variation in execution time is, for example, standard deviation of execution time.

When calculating the stability, the man-hour estimation program 200 may exclude a record of when an error occurs. That is, the stability of execution time may be calculated by excluding a row in which the occurred error number 1310 of the workflow execution record table 1300 is not zero. By the above, it is possible to exclude a record of when a lot of time is spent to cope with occurrence of an error, and it is possible to purely calculate the stability of execution time of the step.

The man-hour estimation program 200 may consider a skill level of a worker when calculating the stability. A skill level of a worker is stored in the worker skill level 1307 of the workflow execution record table 1300. For example, the stability may be calculated by excluding a row having a value of a skill level lower than a certain threshold and excluding a record by a worker at a beginner level.

Further, the man-hour estimation program 200 may calculate stability based on another idea other than the method described above in consideration of a skill level of a worker. For example, a correlation coefficient between a skill level and execution time may be calculated, and an absolute value of the correlation coefficient may be used as the stability. Here, the fact that an absolute value of the correlation coefficient is small can be considered as that the step is a stable step (that is, a step having little variation) in which work time does not depend on a skill level, that is, there is no difference in execution time regardless of who performs work.

In S404, the man-hour estimation program 200 refers to the workflow definition table 400 using a workflow ID and a step number as keys, and acquires definition information of a step.

In S405, the man-hour estimation program 200 refers to development man-hours from several viewpoints. The man-hour estimation program 200 acquires the work instruction sentence 407 and calculates man-hours based on a length of a character string of the work instruction sentence. The program internally has a conversion table of man-hours with respect to a length of a character string, and calculates man-hours based on the table. Alternatively, the man-hour estimation program 200 may calculate man-hours from the number of items of a work instruction sentence instead of a length of a character string. Alternatively, the man-hour estimation program 200 may identify another step that has already been automated and whose development man-hours have been determined from similarity of a character string of a work instruction sentence, and set determined development man-hours as development man-hours of the step. For example, development man-hours of a step having similar description content that has already been determined may be obtained on the basis of similarity with description content of a work instruction sentence in another work procedure manual, and may be used as development man-hours to be calculated. However, since this means that there is already a program that can also be used for this purpose, development man-hours may be further multiplied by a coefficient such as 0.7 or 0.5 to be used as development man-hours of the step.

Further, the man-hour estimation program 200 refers to the check list table 700 using a value of the check list ID 408 as a key, calculates man-hours on the basis of the number of items of a check list corresponding to the step, and adds the calculated man-hours to the man-hours that are already calculated.

In S406, the man-hour estimation program 200 multiplies the man-hours calculated in S405 by the stability calculated in S403 to obtain a new man-hour value.

In S407, the man-hour estimation program 200 multiplies the man-hours obtained in S406 by the weight 1605 in the man-hour estimation rule table 1600 to calculate development man-hours for normal processing, and stores the value in the estimated man-hours 1705 as an estimation value of development man-hours based on a normal processing man-hour rule for the step in the man-hour estimation result table 1700.

Figure 22:
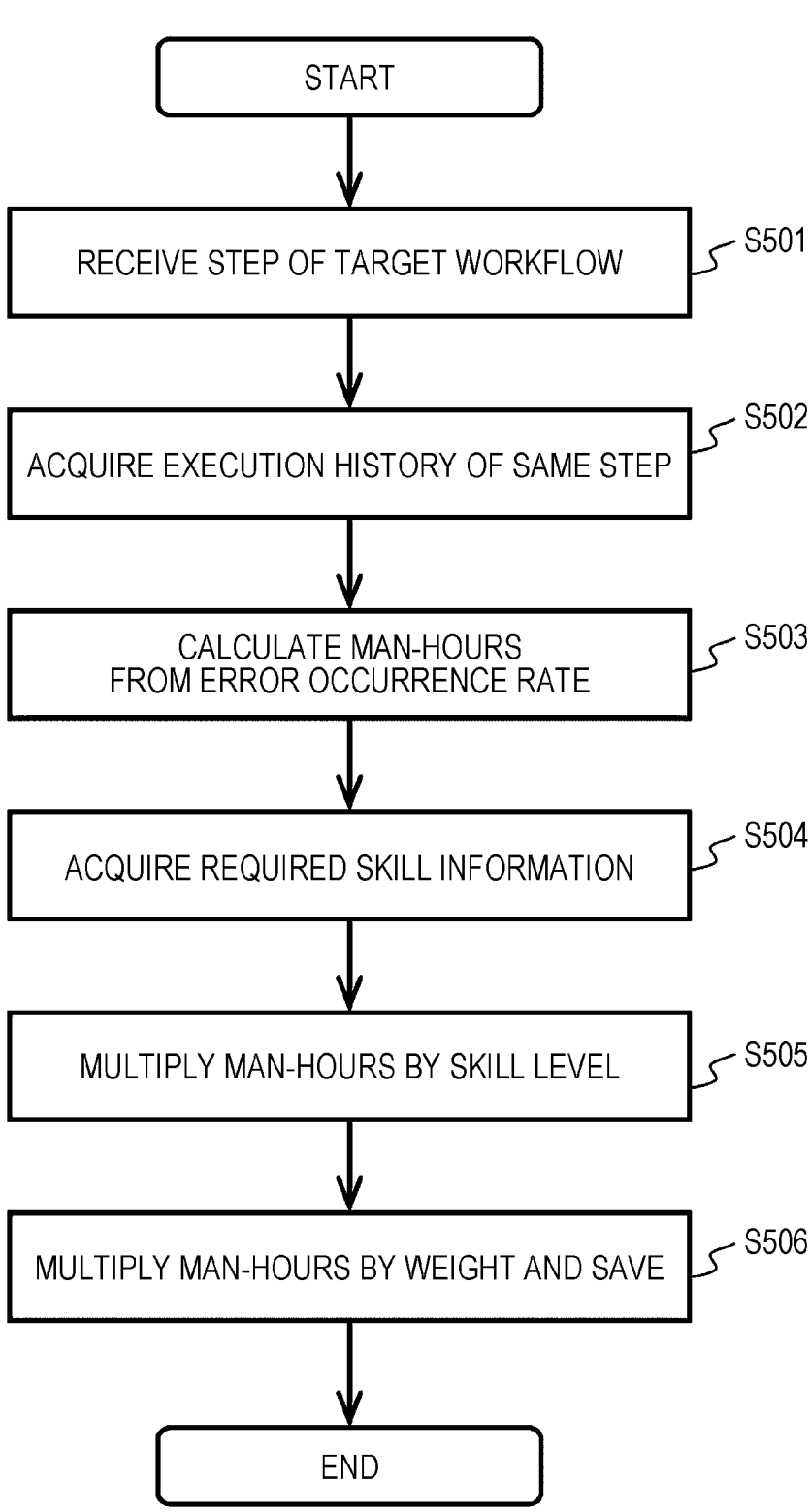
FIG. 22 illustrates an example of a process of processing of estimating error processing development man-hours according to the embodiment.

FIG. 22 illustrates a process of development man-hour estimation processing based on an error processing man-hour rule stored in the man-hour estimation rule table 1600.

In S501, the man-hour estimation program 200 receives a step of a workflow for which man-hours are to be estimated. The step is designated by a workflow ID and a step number.

In S502, the man-hour estimation program 200 refers to the workflow execution record table 1300 using a workflow ID and a step number as keys, and acquires all execution histories for the step.

In S503, the man-hour estimation program 200 calculates an error rate from an execution history of the step acquired in the previous step. That is, a total value of the occurred error number 1310 is divided by the number of rows, and the number of errors per execution of the step is calculated. The man-hour estimation program 200 calculates man-hours for development of error processing on the basis of an error occurrence rate. The program has a conversion table of man-hours with respect to an error rate, and calculates man-hours based on the table.

In S504, the man-hour estimation program 200 refers to the workflow definition table 400 using a workflow ID and a step number of the step as keys, and acquires the required skill level 406 of the step.

In S505, the man-hour estimation program 200 multiplies the man-hours obtained in S503 by the required skill level (skill requirement) acquired in S504. This is because it is considered that work requiring a high skill level has high degree of difficulty in error processing and requires a more complicated response. That is, it is estimated that the higher the skill level, the larger the number of man-hours required for developing error processing. At this time, a value of a skill level may be increased or decreased according to content of a required skill without directly multiplying the value of the skill level. For example, even at the same skill level, processing such as increasing the value for work considered to be more difficult, for example, work handling a database, may be performed.

In S506, the man-hour estimation program 200 multiplies the man-hours obtained in S505 by the weight 1605 in the man-hour estimation rule table 1600 to calculate development man-hours for error processing, and stores the value in the estimated man-hours 1705 as an estimation value of development man-hours based on an error processing man-hour rule for the step in the man-hour estimation result table 1700.

Figure 23:
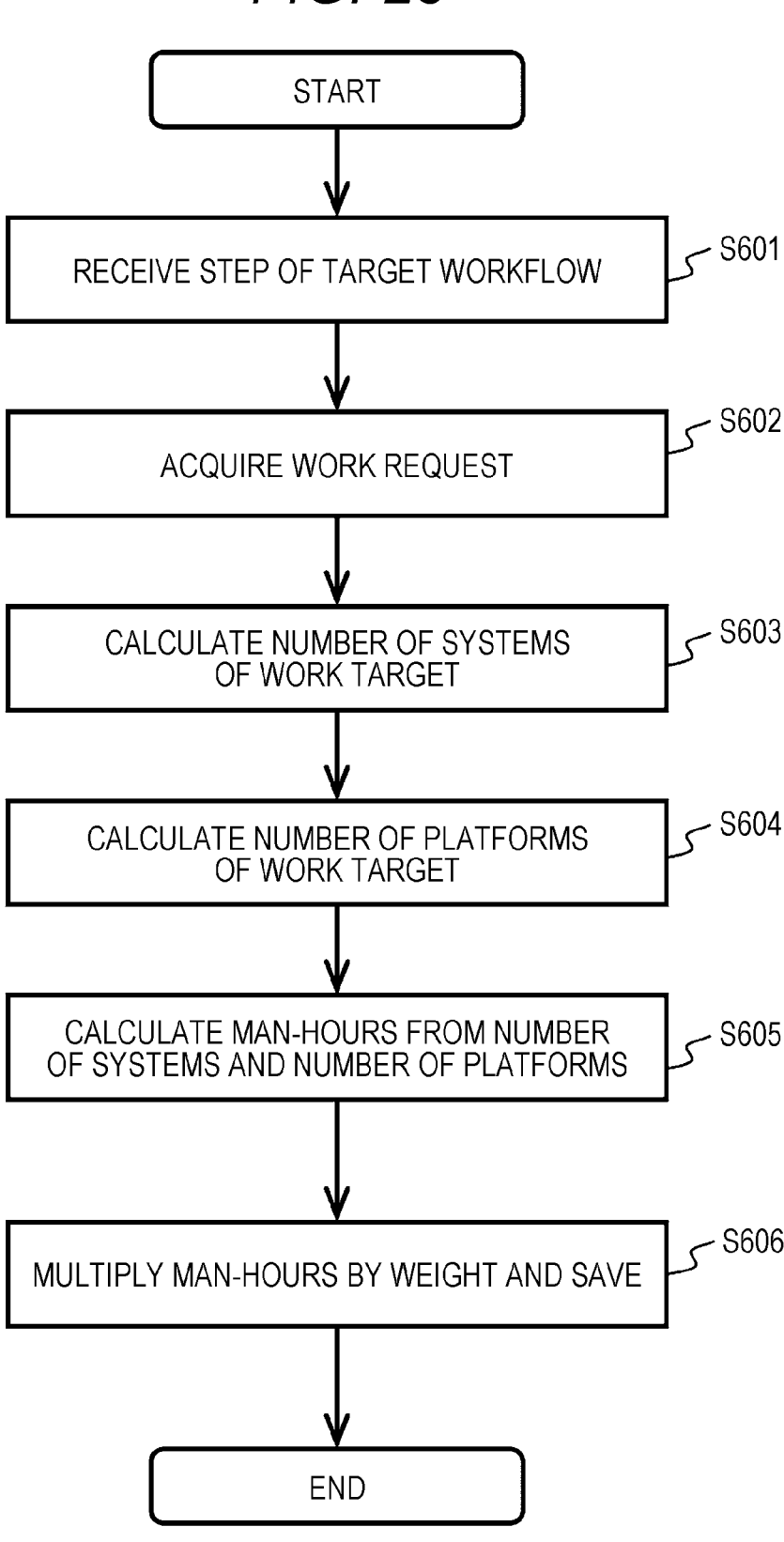
FIG. 23 illustrates an example of a process of test man-hour estimation processing according to the embodiment.

FIG. 23 illustrates a process of development man-hour estimation processing based on a test man-hour rule stored in the man-hour estimation rule table 1600.

In S601, the man-hour estimation program 200 receives a step of a workflow for which man-hours are to be estimated. The step is designated by a workflow ID and a step number.

In S602, the man-hour estimation program 200 refers to the work request table 300 using a workflow ID as a key, and acquires all work requests related to the workflow.

In S603, the man-hour estimation program 200 refers to the target system 304 related to a work target of the work request acquired in the previous step, and calculates the number of types (unique number) of a value of the system. This represents the number of variations of a system as a target of the workflow.

In S604, the man-hour estimation program 200 refers to the work target table 500 using a workflow ID and a step number as keys, and acquires all the work targets 505 in the step. Next, the man-hour estimation program 200 uses these work targets and the target system 304 of the work request as keys to acquire the platform 604 of the work targets by referring to the system configuration table 600. Then, the man-hour estimation program 200 calculates the number of types (unique number) of a value of the platform 604. This represents the number of variations of the platform as a target of the step of the workflow.

In S605, the man-hour estimation program 200 calculates man-hours for a test from the number of systems and the number of platforms. For example, a value obtained by multiplying the number of systems by the number of platforms is set as man-hours for the test. This is based on the idea that test man-hours are required in proportion to a combination of the number of systems and the number of platforms. Alternatively, more simply, a value obtained by adding the number of systems and the number of platforms may be used, or values obtained by multiplying each of the numbers by a coefficient may be added together.

In S606, the man-hour estimation program 200 multiplies the man-hours obtained in S605 by the weight 1605 in the man-hour estimation rule table 1600 to calculate man-hours for the test, and stores the value in the estimated man-hours 1705 as an estimation value of development man-hours by a test man-hour rule for the step in the man-hour estimation result table 1700.

Figure 24:
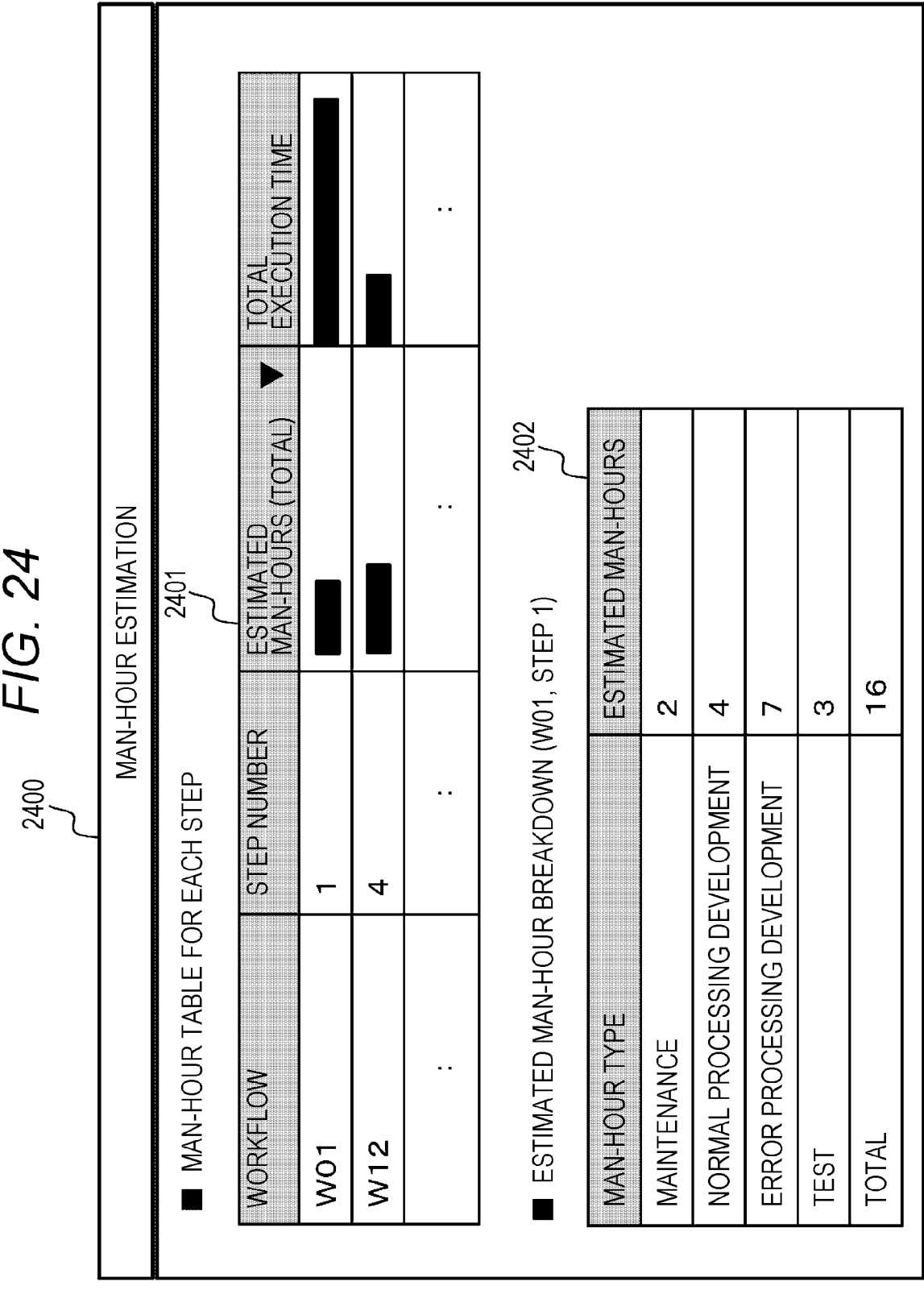
FIG. 24 illustrates an example of a screen for presenting a man-hour estimation result according to the embodiment.

Here, display of a man-hour estimation result will be described with reference to FIG. 24. FIG. 24 illustrates an example of a screen displaying a man-hour estimation result. This screen (man-hour estimation 2400) is displayed on the display 105. An upper part of the screen is a man-hour table 2401 for each step. In the table, estimated man-hours (total) for each step manually performed calculated by the man-hour estimation program 200 are displayed. Further, total execution time for each step is similarly displayed. The total execution time can be calculated from the start time 1308 and the end time 1309 of a row corresponding to the step in the workflow execution record table 1300. A developer who looks at this screen selects a step or workflow to be automated with reference to the total execution time and the total estimated man-hours.

When one step is selected in this table, an estimated man-hour breakdown table 2402 of the step is displayed at a lower part of the screen. The estimated man-hour breakdown table 2402 displays the estimated man-hours 1705 of the step stored in the man-hour estimation result table 1700.

Next, presentation of a bottleneck step will be described. FIG. 25 illustrates a process of processing in which the bottleneck step presentation program 203 identifies and presents a bottleneck step.

In S701, the bottleneck step presentation program 203 reads the screenshot table 1400.

In S702, the bottleneck step presentation program 203 groups rows having the same GUI name 1405. In a case where a value stored in the GUI name 1405 has ambiguity such as an orthographic variant, a group may be created on the basis of similarity of a character string that allows ambiguity. Further, as another method of grouping, the image data 1406 may be used. For example, the image data 1406 may be processed using an image recognition technique so that similar pieces of image data are put together into a group. Further, as another method of grouping, a log file may be used. For example, the log file table 1500 may be referred to with the work ID 1402, the workflow ID 1403 and the step number 1404 as keys, the log data 1503 of the log file may be acquired, so that a group is created based on similarity of output content (character string) of the log file.

In S703, the bottleneck step presentation program 203 counts the number of rows for each group created in the previous step. In this way, a bottleneck step based on the number of screenshots is identified.

In S704 to S705, the bottleneck step presentation program 203 adds up improvement feedback from a worker. First, in S704, the bottleneck step presentation program 203 acquires all rows of the work instruction feedback history table 1100. At this time, rows may be limited to those of latest one month instead of all rows, or a row of a step that is already automated may be excluded.

Next, in S705, the bottleneck step presentation program 203 sorts these rows in descending order of the agreement numbers 1106. Since the magnitude of a value of the agreement number 1106 represents the magnitude of improvement request by a worker, an upper row indicates a bottleneck step that hinders work to that extent. In this way, a bottleneck step based on feedback is identified.

In S706, the bottleneck step presentation program 203 displays the bottleneck step identified in S703 and S705 on a screen on the display 105.

Figure 26:
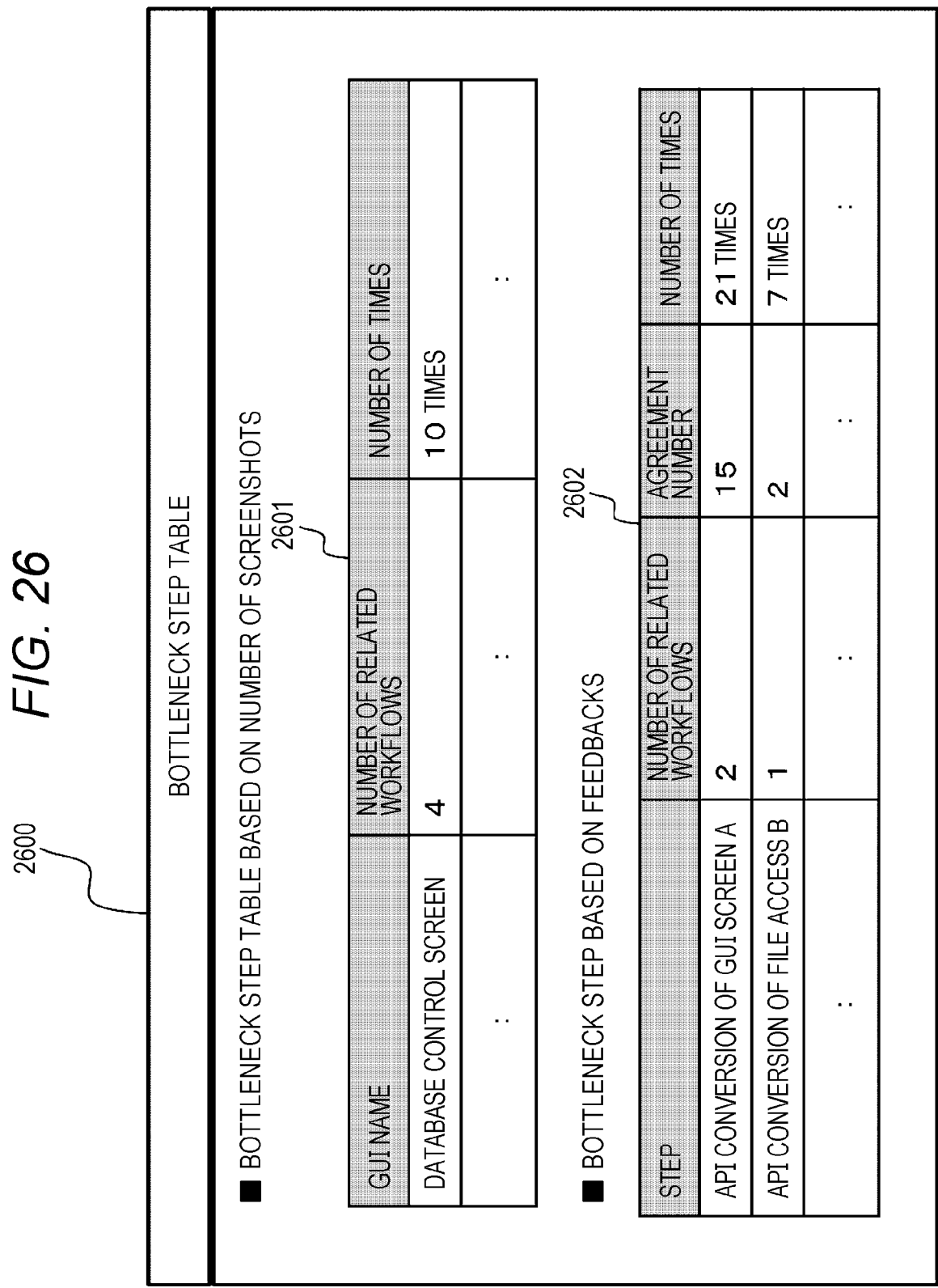
FIG. 26 illustrates an example of a screen for presenting a bottleneck step according to the embodiment.

Here, display of a bottleneck step will be described with reference to FIG. 26. FIG. 26 illustrates an example of a screen displayed by the bottleneck step presentation program 203. A bottleneck step table 2600 is displayed on the screen. A bottleneck step table 2601 based on the number of screenshots added up in S703 is displayed at an upper part. A related workflow number is the number of types of workflows related to the bottleneck step, and can be calculated as a unique number of the workflow ID 1403 in a row of the screenshot table 1400 grouped in S706. The number of times can be calculated as the number of rows included in a group. A developer who looks at this table can understand that steps having a large number of times are preferably automated in order.

In a lower part of the bottleneck step table 2600, a bottleneck step 2602 based on the feedbacks added up in S705 is displayed. The feedback content 1105 is displayed in feedback content of the list, a unique number of the workflow ID 1102 of the row in the work instruction feedback history 1100 is displayed in the related workflow number, and the agreement number 1106 is displayed in the agreement number. In the number of times in the list, the workflow execution record table 1300 is referred to with the workflow ID 1102 and the step number 1103 as keys, and the number of corresponding rows (corresponding to the number of executions of the step) is displayed. A developer who looks at this table can understand that steps having a large agreement number or number of times are preferably automated in order.

Figure 27:
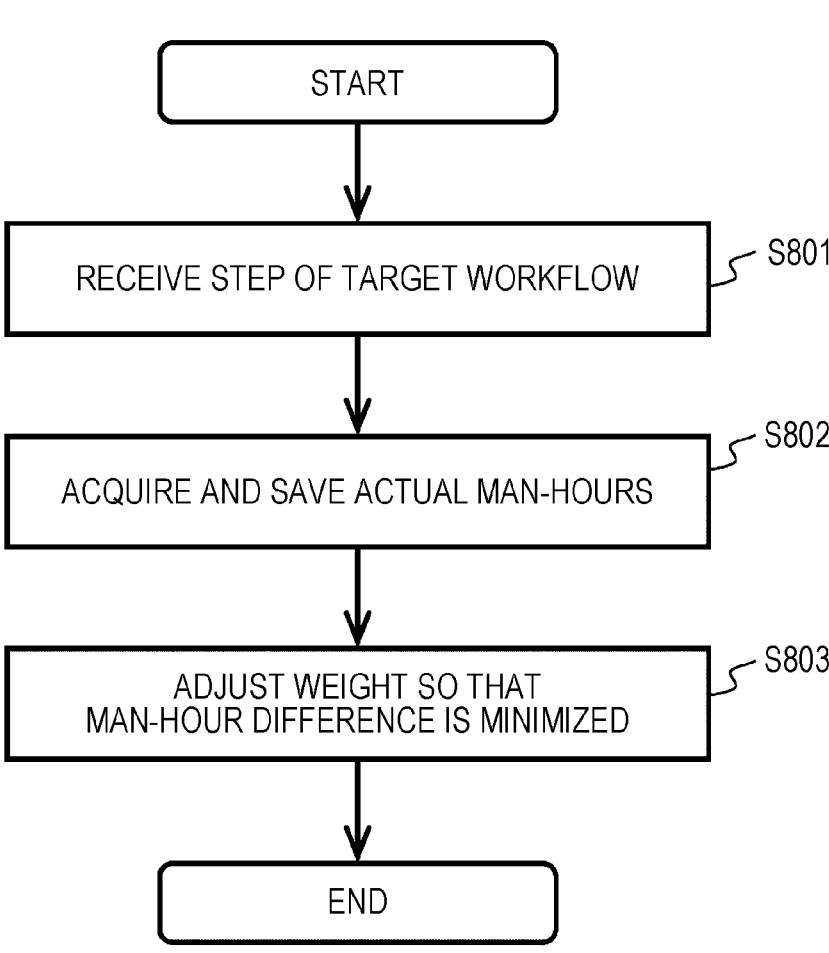
FIG. 27 illustrates an example of a process of processing for improving accuracy for estimating man-hours according to the embodiment.

FIG. 27 illustrates a process of processing in which the man-hour estimation program 200 adjusts a value of the weight 1605 of the man-hour estimation rule table 1600 on the basis of a difference between estimated man-hours and actual man-hours actually required to improve accuracy of estimating man-hours.

In S801, the man-hour estimation program 200 receives a step of a target workflow. The step is designated by a workflow ID and a step number. A target step is a step for which development from manual work to automatic processing is completed by a developer.

In S802, the man-hour estimation program 200 cooperates with an external development tool to acquire man-hours required for development of the target step. The acquired man-hours is stored in the total actual man-hours 1708 of the man-hour estimation result table 1700. Development man-hours can be calculated as man-hours required until release of automatic processing, and maintenance man-hours can be calculated as man-hours required after release. For the development man-hours, in a case where a further breakdown, that is, a breakdown of man-hours required for development of normal processing, man-hours required for development of error processing, test man-hours, and the like is known, a value of the breakdown is stored. In a case where the breakdown is unknown, a total value is stored.

In S803, the man-hour estimation program 200 adjusts the weight 1605 of each estimation rule in the man-hour estimation rule table 1600 on the basis of a difference between the total estimated man-hours 1707 (if a breakdown is known, the estimated man-hours 1705) of the man-hour estimation result table 1700 and the total actual man-hours 1708. A method of calculating a weight may be, for example, a method based on a linear regression equation. That is, there may be used a calculation method of creating a linear regression equation with an objective variable set to the total actual man-hours 1708 of each step accumulated in the man-hour estimation result table 1700 and an explanatory variable set to the estimated man-hours 1705 of each rule, and a coefficient relating to estimated man-hours is used as a weight. As another method, another regression algorithm may be used instead of the linear regression equation. For example, an algorithm capable of more accurate estimation, such as Ramdom Forest regression or Support Vector regression, may be used. In this case, the objective variable and the explanatory variable are the same as those in the case of using linear regression, but since there is no weight of each rule as in the linear regression, a regression model generated instead of a weight is stored as a binary.

From the above description, the management computer 100 capable of calculating estimation values of development man-hours and maintenance man-hours relating to automation of work on the basis of a man-hour estimation rule with work request information such as a skill necessary for work, content of a work procedure and a change history of the work procedure, and a work execution history (work time, a skill of a worker, and a log output by work) as inputs is provided. Further, the management computer 100 can identify and present a bottleneck step that hinders automation on the basis of a screenshot obtained by capturing a screen of a work result and feedback from a worker.

According to the present embodiment, it is possible to easily calculate man-hour estimation for automating work that is being manually performed, and it is possible to easily identify a step that hinders automation (a bottleneck step, for example, a step that is difficult to be automated since there is no operation method other than a GUI). Then, automation of manual work can be efficiently advanced. That is, according to the present embodiment, since manual work having a high time reduction effect with respect to man-hours and a bottleneck step can be easily known, automation can be efficiently advanced, and as an example, contribution can be made from an economic viewpoint.

To eliminate a bottleneck step, for example, cooperation of a business department and a development department in charge of an IT system is necessary. If a bottleneck step is known, an operation department can quantitatively show improvement in work efficiency by converting the bottleneck step into API as data for convincing a business department and a development department, and can easily obtain cooperation of other departments from the viewpoint of overall optimization. According to the present embodiment, since a bottleneck step can be easily known, automation can be efficiently advanced also from such a viewpoint.

Although the embodiment of the present invention is described in detail above, the present invention is not restricted to the above embodiment, and various design changes can be made without departing from the spirit of the present invention described in the claims. For example, the above embodiment is described in detail for easy understanding of the present invention, and the present invention is not necessarily limited to an embodiment that includes all the described configurations. Further, for a part of a configuration of the embodiment, other configurations may be added, removed, or replaced with.

What is claimed is:

1. An automation support device for selecting for computer-implemented automation in an information technology system a procedure of work formerly performed manually comprising:

a processor; and a storage unit, wherein the storage unit stores a man-hour estimation rule that is a rule for calculating a man-hour for automation of a work procedure manual related to the procedure of work formerly performed manually, the processor performs a calculation of an amount of man-hours required for automation of the work procedure manual by using the man-hour estimation rule stored in the storage unit with the work procedure manual and a work execution record that is a record of execution according to the work procedure manual as inputs;

the processor determines based on the calculation that the procedure of work formerly performed manually to be performed automatically by the information a technology system;

the processor determines a bottleneck step by totaling a number of GUI screenshots in a work execution record and the processor instructs the information technology system to automatically perform the procedure of work formerly performed manually, including automating the bottleneck step.

2. The automation support device according to claim 1, wherein the storage unit stores the man-hour estimation rule used by the processor to calculate a man-hour required for automation of the work procedure manual based on a length of a character string and/or number of items of work instruction content included in the work procedure manual.

3. The automation support device according to claim 1, wherein the work procedure manual includes a check list for checking that work is normally completed, and the storage unit stores the man-hour estimation rule used by the processor to calculate a development man-hour required for automation of the work procedure manual based on number of check items of the check list.

4. The automation support device according to claim 1, wherein the storage unit stores the man-hour estimation rule used by the processor to calculate a development man-hour required for automation of the work procedure manual based on a development man-hour of another work procedure manual that has a high degree of similarity with the work procedure manual in description content and for which a development man-hour is determined.

5. The automation support device according to claim 1, wherein the storage unit stores the man-hour estimation rule used by the processor to calculate a development man-hour required for automation of the work procedure manual by calculating stability relating to variation in work time of the work procedure manual based on the work execution record and multiplying a calculated development man-hour by the stability.

6. The automation support device according to claim 1, wherein the storage unit stores the man-hour estimation rule used by the processor to calculate a man-hour required for maintenance of the work procedure manual changed after automation based on a change frequency of the work procedure manual.

7. The automation support device according to claim 6, wherein the change frequency is determined based on number of changes per elapsed time after the work procedure manual is changed or number of changes per number of executions of the work procedure manual.

8. The automation support device according to claim 1, wherein the storage unit stores the man-hour estimation rule used by the processor to calculate a man-hour required for automation of the work procedure manual by further using a skill requirement indicating a degree of difficulty of input work.

9. The automation support device according to claim 8, wherein the work execution record includes a record of number of times of error occurrence during work, and the man-hour estimation rule is a rule defining that the processor calculates an error occurrence rate from the number of times of error occurrence and calculates a development man-hour related to error processing by further using the error occurrence rate.

10. The automation support device according to claim 1, wherein the storage unit stores the man-hour estimation rule used by the processor to calculate a man-hour required for automation of the work procedure manual by further using a work target which is an input target of work, and the man-hour estimation rule is a rule defining that the processor calculates a man-hour required for automation of the work procedure manual based on number of types of the work targets.

11. The automation support device according to claim 1, wherein the storage unit stores a weight set for the man-hour estimation rule, and the processor further adjusts a value of the weight set for the man-hour estimation rule so as to reduce a difference between an actual man-hour required for automation of the work procedure manual and a man-hour obtained by multiplying a man-hour calculated based on the man-hour estimation rule by the weight.

12. The automation support device according to claim 1, further comprising:

a display device, wherein the processor accumulates, in the storage unit, a record of a screenshot of a screen indicating normal completion of work associated with the work procedure manual in the work execution record, and presents, on the display device, work with a large number of counts of a same type of the screenshots as work that hinders automation.

13. The automation support device according to claim 1, further comprising:

a display device, wherein the processor accumulates, in the storage unit, feedback in which a worker designates a description portion that hinders automation of work in the work procedure manual, and presents, on the display device, work related to a portion with a large number of pieces of feedback as work that hinders automation.

14. An automation support method for selecting for computer-implemented automation in an information technology system a piece of work formerly performed manually and performed using a processor and a storage unit, the automation support method comprising:

causing the processor to acquire a work procedure manual related to a procedure of work and a work execution record which is a record of execution according to the work procedure manual, and calculate an amount of man-hours required for automation of the work procedure manual by referring to a man-hour estimation rule that is a rule for calculating a man-hour required for automation of the work procedure manual stored in the storage unit and using the man-hour estimation rule;

determine based on the amount of man hours required that the procedure of work formerly performed manually to be performed automatically by the information a technology system;

determine a bottleneck step by totaling a number of GUI screenshots in a work execution record; and instruct the information technology system to automatically perform the procedure of work formerly performed manually including automating the bottleneck step.

15. A non-transitory computer readable storage medium having stored thereon a program for causing a processor to execute the automation support method according to claim 14.

* * * * *